US012536161B2

(12) United States Patent
Raghuraman et al.

(10) Patent No.: US 12,536,161 B2
(45) Date of Patent: Jan. 27, 2026

(54) EFFICIENT VERIFICATION OF DIFFERENTIALLY-PRIVATE DIGITAL DATA

(71) Applicant: VISA INTERNATIONAL SERVICE ASSOCIATION, San Francisco, CA (US)

(72) Inventors: Srinivasan Raghuraman, Cambridge, MA (US); Chenghong Wang, San Francisco, CA (US); Sebastian Meiser, Lubeck (DE)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/711,087

(22) PCT Filed: Sep. 30, 2022

(86) PCT No.: PCT/US2022/045441
§ 371 (c)(1),
(2) Date: May 16, 2024

(87) PCT Pub. No.: WO2023/091241
PCT Pub. Date: May 25, 2023

(65) Prior Publication Data
US 2025/0013634 A1    Jan. 9, 2025

Related U.S. Application Data

(60) Provisional application No. 63/281,549, filed on Nov. 19, 2021.

(51) Int. Cl.
*G06F 16/242* (2019.01)
*G06F 16/248* (2019.01)
(Continued)

(52) U.S. Cl.
CPC .......... *G06F 16/244* (2019.01); *G06F 16/248* (2019.01); *G06F 21/602* (2013.01); *G06F 21/6227* (2013.01)

(58) Field of Classification Search
CPC .... G06F 16/244; G06F 16/248; G06F 21/602; G06F 21/6227; G06F 16/2462
(Continued)

(56) References Cited

U.S. PATENT DOCUMENTS 10,740,328 B2 * 8/2020 Ding ................... G06F 16/2453
2007/0143289 A1 * 6/2007 Dwork ................ G06F 16/2455
707/999.009

(Continued)

OTHER PUBLICATIONS

Kato et al., "Preventing Manipulation Attack in Local Differential Privacy Using Verifiable Randomization Mechanism", Arxiv.org, Cornell University Library, Jun. 9, 2021, pp. 1-18.
(Continued)

*Primary Examiner* — Phong H Nguyen
(74) *Attorney, Agent, or Firm* — Kilpatrick Townsend & Stockton LLP

(57) ABSTRACT

Embodiments of the present disclosure enable users to efficiently verify digital data produced by queried databases, even when that data is differentially-private (e.g., satisfying the conditions of differential privacy in order to protect sensitive or private data). In addition to the query result, a database computer can provide the client with a non-interactive zero-knowledge proof (NIZK), data that the client can use to verify the digital data contained in the query result, without revealing any private data to the client. Various innovations, including vectorized proofs, enable the database computer to generate proofs that require less data (e.g., when measured in bytes) than most NIZK proof systems. Consequently, these proofs can be transmitted and verified more quickly and efficiently. Embodiments of the present disclosure can make use of partially or homomorphic commitments and efficient vector proof techniques to achieve these performance improvements.

20 Claims, 11 Drawing Sheets

(51) Int. Cl.
    *G06F 21/60*   (2013.01)
    *G06F 21/62*   (2013.01)

(58) Field of Classification Search
    USPC .............................. 707/722, 736, 758, 769
    See application file for complete search history.

(56) References Cited

U.S. PATENT DOCUMENTS

| | | | | |
|---|---|---|---|---|
| 2013/0262498 | A1* | 10/2013 | Chen | G06F 16/2453 |
| | | | | 707/765 |
| 2016/0335455 | A1* | 11/2016 | Mohan | G06F 16/90335 |
| 2017/0169253 | A1* | 6/2017 | Curcio | G06F 21/6254 |
| 2019/0065775 | A1* | 2/2019 | Klucar, Jr. | G06F 16/24552 |

OTHER PUBLICATIONS

Narayan et al., "Verifiable Differential Privacy", Available Online at https://haeberlen.cis.upenn.edu/papers/verdp-eurosys2015.pdf, Apr. 17, 2015, pp. 1-14.

Application No. PCT/US2022/045441, International Search Report and Written Opinion, Mailed On Dec. 22, 2022, 12 pages.

Xu et al., "Collecting and Analyzing Data Jointly from Multiple Services under Local Differential Privacy", Available Online at https://people.cs.uchicago.edu/~xum/docs/ldpjoin-vldb20.pdf, vol. 13, No. 12, Sep. 14, 2020, pp. 2760-2772.

Bünz, B. et al., "Bulletproofs: Short Proofs for Confidential Transactions and More," 2018 IEEE Symposium on Security and Privacy (SP), San Francisco, CA, USA, 2018, pp. 315-334.

Ben-Sasson, E. et al.,. "Some 3CNF properties are hard to test." SIAM Journal on Computing 35.1 (2005): 10 pages.

* cited by examiner

Table 1. Summary of Notation

| Notation | Description |
|---|---|
| $D = \{x_1, x_2, \ldots, x_n\}$ | A dataset $D$ (stored in one or more databases) comprising data records $x_i$ |
| $q: D \to \mathbb{Z}$ | A database query $q$ on dataset $D$ |
| $\tilde{q}: D \to \mathbb{R}$ | A differentially-private query $\tilde{q}$ on dataset $D$, which can be computed as $\tilde{q} \leftarrow q + z(\epsilon, \delta)$ where $z$ is differentially private noise calculated using privacy parameters $\epsilon$ and $\delta$ |
| $z(\epsilon, \delta)$ | Differentially-private noise calculated using privacy parameters $\epsilon$ and $\delta$ (a.k.a. a noise value) |
| $\phi: x \to \{0, 1\}$ | Boolean predicate function |
| $\tilde{q}(D) \leftarrow \sum_{i}^{n} \phi(x_i) + z(\epsilon, \delta)$ | Differentially-private linear counting query on Boolean predicates. |
| $c$ | A commitment function |
| $c_{data} = c(x_i)$ | A commitment of a data record $x_i$ (a.k.a. a data record commitment) |
| $c_{pred} = c(\phi(x_i))$ | A commitment of a predicate $\phi(x_i)$ generated using a data record $x_i$ and a predicate function $\phi$ (a.k.a. a predicate commitment) |
| $c_{noise} = c(z(\epsilon, \delta))$ | A commitment of a noise value $z(\epsilon, \delta)$ (a.k.a. a noise value commitment) |

*FIG. 1*

EFFICIENT VERIFICATION OF DIFFERENTIALLY-PRIVATE DIGITAL DATA

CROSS-REFERENCES TO RELATED APPLICATIONS

This application is a 371 application of International Application No PCT/US2022/045441, filed on Sep. 30, 2022, which claims the benefit of U.S. Provisional Application No. 63/281,549, filed Nov. 19, 2021, which is herein incorporated by reference in its entirety for all purposes.

BACKGROUND

Differential privacy can refer to systems or techniques for sharing information about a dataset, without unintentionally providing information about individual data records in that data set. This may be useful if data records correspond to individuals who may not want to be identified. For example, differential privacy can be used to provide the HIV rate in a city, without enabling entities (e.g., people, businesses) to determine whether a specific individual in that city has HIV. As another example, differential privacy can be used to provide the average income in a city, without enabling entities to determine the income of a specific individual.

In general terms, differential privacy can be accomplished by including a random noise value when the particular statistic (e.g., HIV rate, income) is calculated. This noise value is typically small enough that it does not meaningfully distort the result of a statistic corresponding to a large number of data records (e.g., average income of a city, state, country, etc.), but is large enough that it meaningfully distorts the result of a statistic corresponding to a small number of data records (e.g., income of a single individual or household). As such, meaningful statistics can be provided while preserving the privacy of individuals.

There are a variety of differentially-private systems that can be modeled in a variety of ways. One exemplary system can comprise data subjects, a data curator, vetted data analysts, and a group of readers. The group of data subjects can correspond to data records stored in a database managed by the data curator. For example, the group of data subjects could comprise individuals who tested positive for an infectious disease. Each of these individuals could have a corresponding record stored in a database managed by a government health agency such as the CDC (the data curator).

The data curator can make the data records accessible to the vetted data analysts, who could comprise, for example, scientists and statisticians operating out of the CDC or medical research universities. The data analysts can study the data by issuing analytical queries (e.g., "what is the infection rate of COVID among males in Chicago?"), and release their findings (e.g., the results of queries, or the analysis of results of queries, such as comparisons between infection rates among different populations) to readers in a differentially-private (or otherwise privacy preserving) manner. These readers can comprise individuals, businesses, policy-makers, etc., who can interpret and use these findings as they see fit.

One issue with the above model (and differential privacy in general) is that due to the private nature of individual data records, it can be difficult for the readers to verify differentially-private statistics. A reader cannot typically verify whether, for example, the actual infection rate of a region is equal to the reported infection rate, because the data elements (e.g., data records corresponding to individual private medical data) cannot be revealed without violating the privacy of the data subjects.

Another issue is that the data subjects do not have access to the methods, techniques, or processes used by the data analysts, and therefore must trust that the data analysts are properly safeguarding their private data. For example, the data subjects don't know if the data analysts used proper differential privacy parameters, or whether the data analysts implemented differential privacy at all.

As such, readers and data subjects want the ability to verify the digital data produced by database queries, including differentially-private queries. Data subjects (or, e.g., organizations that represent the rights of data subjects) want to know that their data is being properly safeguarded. Likewise, readers want to know that data presented to them is accurate. For example, a government administrator may want to confirm that data regarding the spread of a disease is accurate, before implementing unpopular or economically disruptive policy to limit the spread of the disease.

Verifiable computation is one means that these readers and data subjects may use to verify the digital data produced by query results and can broadly refer to techniques that can be used to prove whether the result of a computation (e.g., a differentially-private statistic, such as a rate of infection, average household income, etc.) was computed correctly. Some verifiable computation techniques involve the generation of data referred to as a "zero-knowledge proof" that can be used by entities to verify the result of a computation (e.g., a query), without needing access to the underlying (private) data used to produce that computation.

In computer science, there is a concept known as "complexity" that relates how difficult, computationally intensive, time intensive, memory intensive, etc., a particular process is. The higher the time complexity, the longer a process typically takes to complete. The higher the memory complexity, the more memory is needed to complete a process. Unfortunately, many zero-knowledge proof techniques produce proofs that require a large amount of memory and that require a large amount of time to verify. This poses a variety of problems for entities that are interested in verifying the results of differentially-private queries.

For instance, if such proofs require a lot of digital data to represent, it may be difficult to transmit these proofs over networks such as the Internet. A reader or data subject with a poor internet connection may not be able to receive these proofs, or it may require a considerable amount of time to transmit these proofs. Additionally, readers or data subjects without access to strong computational resources (e.g., fast modern computers) may not be able to verify these proofs, or it may require a considerable amount of time to verify these proofs. As such, using zero-knowledge proofs for verifying digital data corresponding to differentially-private queries is often impractical, and readers and data subjects often can only trust the presented results or the assertion of privacy, without being able to verify it for themselves.

Embodiments address these and other problems, individually and collectively.

SUMMARY

Embodiments of the present disclosure enable a client operating a client computer (e.g., an individual, scientist, policy maker, etc.) to query a database computer to receive digital data or digital records (i.e., a query result) corresponding to that query, along with one or more proofs (which may comprise a number of commitments) that enable the client computer to verify the digital data comprising the query result. The client computer can verify the query result without needing access to any data records used to produce the query result.

Methods according to embodiments can include two categories. The first category relates to individual commitment-based (or "non-vectorized") aggregation query methods. Using such methods, a database computer can receive an aggregation query from a client computer, determine a query result and a proof (proving the accuracy of the query result) comprising a variety of commitments, and transmit the query result and the proof to the client computer. The client computer can use the proof to verify the accuracy of the query result, which can include verifying digital records (stored in a database) used to produce that query result. The proof produced by the database computer (using non-vectorized aggregation query methods) can scale linearly with the size of the queried dataset, which is an improvement over conventional NIZK proof methods that achieve worse than linear (e.g., quadratic) scaling. Consequently, the proof can be more quickly transmitted over networks such as the Internet, and more quickly and efficiently evaluated by the client computer.

The second category relates to vectorized aggregation query methods. Using such methods, a database computer can receive an aggregation query from a client computer. The database computer can reinterpret the query in such a way that it can be evaluated as a series of vector operations performed on data vectors stored in the database. The database computer can determine a query result and a proof (proving the correctness of the query result), and transmit the query result and the proof to the client computer. The client computer can use the proof to verify the correctness of the query result, which can include verifying digital records (stored in a database) used to produce that query result.

Because the query result was generated using data vectors, rather than data records, the proof can prove the correctness of each data vector rather than each data record. Because each data vector typically comprises multiple data records, the database computer generally has to prove the correctness of less information. The database computer can also use new and effective vector proving systems, such as the Bulletproofs [1] system. Consequently, the proof produced by the database computer (using the vectorized aggregation query method) can scale better than linearly (e.g., logarithmically) with the size of the queried dataset, which is also an improvement over conventional NIZK proof methods that achieve worse than linear (e.g., quadratic) scaling. Consequently, the proof can be more quickly transmitted over networks such as the Internet, and more quickly and efficiently evaluated by the client computer.

In more detail, one embodiment is directed to a method of servicing differentially-private aggregation queries performed by a database computer. The database computer can receive an aggregation query identifying one or more attributes from a client computer. The database computer can use the one or more attributes to identify a plurality of digital data records stored in a database communicably coupled to the database computer. The database computer can generate and publish a plurality of data record commitments corresponding to the plurality of digital data records, such that the plurality of data record commitments are accessible to the client computer. The plurality of data record commitments can be configured to enable the client computer to verify the plurality of digital data records.

Using the plurality of digital data records and a predicate function, the database computer can generate a plurality of predicates. The database computer can obtain a plurality of predicate commitments generated using a commitment function. The plurality of predicate commitments can be based on the plurality of predicates. The database computer can generate a noise value using one or more privacy parameters. The database computer can generate a noise value commitment using the noise value and the commitment function. The database computer can aggregate the plurality of predicates and the noise value to generate a query result. The database computer can then transmit the query result, the plurality of predicate commitments, and the noise value commitment to the client computer. These data can be configured to enable verification of the query result by the client computer.

Another embodiment is directed to another method of servicing differentially-private aggregation performed by a database computer. The database computer can receive an aggregation query identifying one or more attributes and comprising one or more query clauses. The database computer can identify one or more data record vectors based on the one or more attributes. The one or more data record vectors can correspond to a plurality of digital data records stored in a database communicably coupled to the database computer. The database computer can generate and publish one or more data vector proofs corresponding to the one or more data record vectors, such that the one or more data record vector proofs are accessible to the client computer. The one or more data vector proofs can be configured to enable the client computer to verify the plurality of digital data records.

The database computer can generate one or more predicate vectors based on the one or more data records and one or more predicate functions corresponding to the one or more query clauses. The database computer can obtain one or more predicate vector proofs based on the one or more predicate vectors. The database computer can determine a vector operation form of the aggregation query, which can define a sequence of one or more vector operations to be performed on the one or more predicate vectors or one or more vectors derived from the one or more predicate vectors. Each vector operation of the one or more vector operations can be applied to one or more predicate vectors of the one or more predicate vectors. The database computer can generate one or more vector operation proofs based on the one or more vector operations. The database computer can additional generate a noise value using one or more privacy parameters. The database computer can generate a noise value commitment using a commitment function and the noise value. The database computer can generate a query result by evaluating the vector operation form of the aggregation query using one or more predicate vectors and adding the noise value. The database computer can transmit the query result, the one or more predicate vector proofs, the one or more vector operation proofs and the noise value commitment to the client computer. These data can be configured to enable verification of the query result by the client computer.

These and other embodiments are described in more detail below. For example, other embodiments may be directed to systems, devices, and computer readable media associated with methods described herein, such as a database computer configured to perform the methods described above.

Prior to describing specific embodiments of the disclosure, some terms may be described in detail.

Terms

A "server computer" may include a powerful computer or cluster of computers. For example, the server computer can include a large mainframe, a minicomputer cluster, or a group of servers functioning as a unit. In one example, a server computer can include a database server coupled to a web server. The server computer may comprise one or more computational apparatuses and may use any of a variety of computing structures, arrangements, and compilations for servicing the requests for one or more "client computers."

A "memory" may include any suitable device or devices that may store electronic data. A suitable memory may comprise a non-transitory computer readable medium that stores instructions that can be executed by a processor to implement a desired method. Examples of memories include one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system generated requests. The CPU may be a microprocessor such as AMDs Athlon, Duron and/or Opteron; IBM and/or Motorola's PowerPC; IBM's and Sony's Cell processor; Intel's Celeron, Itanium, Pentium, Xenon, and/or Xscale; and/or the like processor(s).

A "database" may include any structure used to store data, which may be organized into "datasets." Such datasets may comprise "data elements," "data records," (including digital data records), "data record vectors," etc. A "data record vector" may refer to a list or array of one or more data records. A database may comprise a physical structure (e.g., a specialized computer system or memory element) that stores data, or may refer to organized memory on a computer used to store data (e.g., a filing system implemented using a computer's operating system).

A "commitment" may refer to a cryptographic primitive that allow entities to "commit" to something while keeping that thing hidden, thereby generating a "commitment value" corresponding to the thing being committed. Later, an entity can reveal the commitment value. A "commitment function" may refer to a function that can be used to generate commitments corresponding to inputs. A homomorphic commitment may comprise a commitment that satisfies homomorphic properties. That is, mathematical relationships between commitment inputs may be preserved when those same relationships are applied to commitments.

A "zero-knowledge proof" (sometimes just "proof") may refer to a statement that demonstrates proof of something without revealing any additional information ("knowledge") about that thing. For example, a zero-knowledge proof can be used to prove that an entity knows a secret value without revealing the value. As another example, a zero-knowledge proof can be used to verify the output of a computation without revealing the inputs of the computation.

An "aggregation" may refer to a combination of values or other data. Examples of aggregations include counts, sums, averages, and the like.

A "query" may refer to a request to access data from a database. The response to a query may be referred to as a "query result" and may contain the data requested from the database. A query may conform to a query language, such as SQL. An "aggregation query" may refer to a request to access data comprising a combination of values or other data. A "differentially-private query" may refer to a query that produces a differentially-private query result, a query result that protects the privacy of the data records used to produce that query result.

A "noise value" may refer to a non-ordered or random value. A noise value may be added to data to make it "noisy," thereby reducing the information contained in the data. Noise may be added to private data to preserve privacy. For example, "differentially-private noise" can be added to sensitive or private data to prevent that data from leaking any sensitive or private information. Differentially-private noise can be generated using "privacy parameters," which may refer to parameters used to control qualities of the noise (e.g., amplitude, frequency, complexity, etc.).

An "operation form" of a computation may comprise a definition of the computation as a series or sequence of operations to be performed on specified data. For example, the operation form of a computation such as $A+B+C=D$ may comprise two addition operations, $A+B$ and $(A+B)+C$, described as being performed in sequence. A "vector operation form" may comprise a sequence of vector-based operations to be performed on specified vectors.

BRIEF DESCRIPTION OF THE DRAWINGS

FIG. 1 shows a table detailing some notation and mathematical conventions used throughout this disclosure.

DETAILED DESCRIPTION

Figure 2:
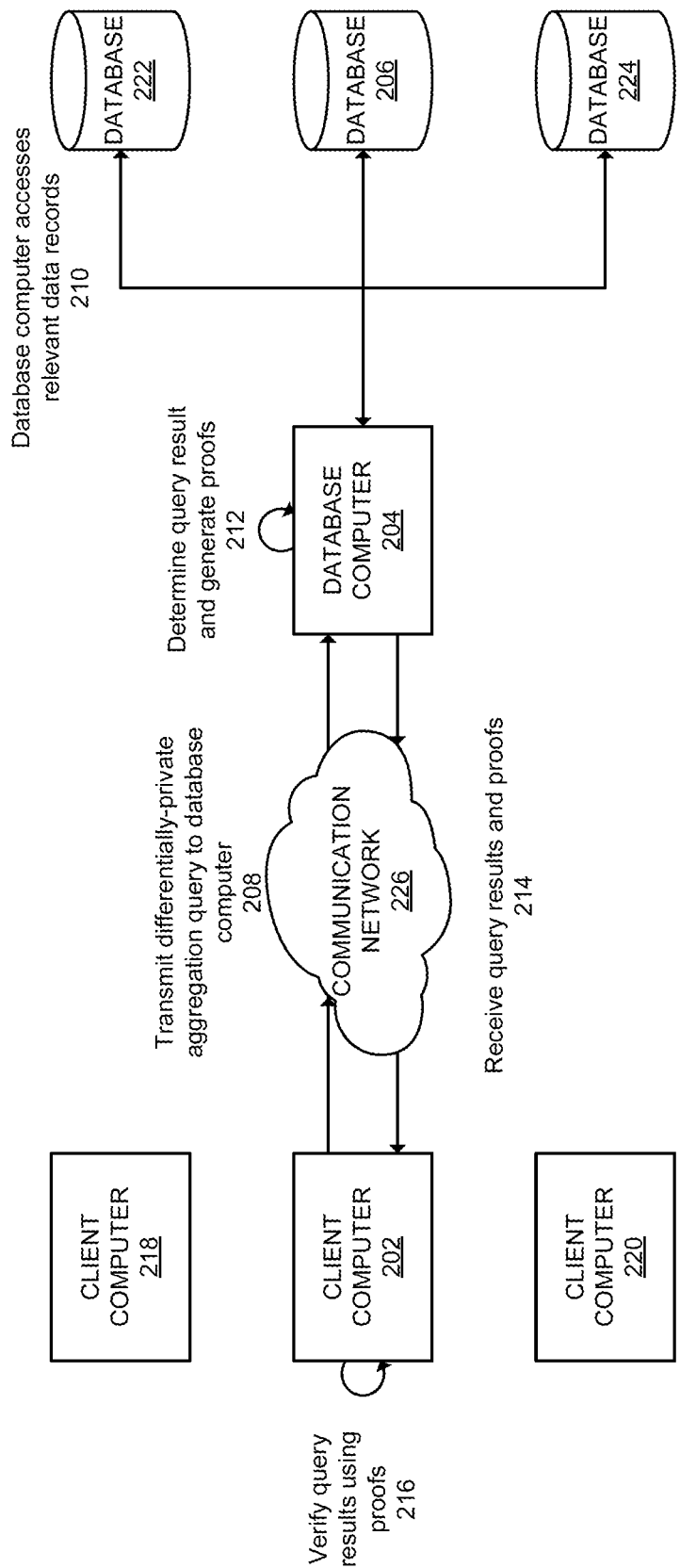
FIG. 2 illustrates an exemplary differentially-private query processing system according to some embodiments.

Various embodiments are directed to methods and systems for evaluating differentially-private queries and generating efficient, "short" (e.g., containing a smaller amount of digital data than "long" or "normal") proofs that can be used to verify that query results were determined correctly. Embodiments are more specifically directed to methods and systems for evaluating differentially-private aggregation queries. Aggregation queries have some properties (when compared to a hypothetical "generic" query) that enable digital data produced from these queries (e.g., query results) to be verified more efficiently, consequently reducing the proof size, the time needed to verify such proofs, etc. Particularly, aggregation queries can be verified using homomorphic commitments, as described in further detail below.

As defined above, an aggregation query generally refers to a query where the result is an aggregation (e.g., a sum, an average, etc.) of data values that are usually within some defined range. An example of an aggregation query is a counting query, such as "how many users have administrator access?" The answer to such a query can be determined by parsing through a list of users (e.g., data records in a data set) and counting (i.e., aggregating) each user that has administrator access.

As another example, to verify a query result such as "the average income in City A is $50,000", a client would typically sum up all the individual incomes of people in City A, divide it by the total number of people in City A to produce the average income, then compare their result to the $50,000 value. However, in doing so, the client would need to gain access to private information (e.g., individual incomes), which would violate the privacy of those individuals. However, the proofs according to embodiments of the present disclosure enable the client computer to verify the query result without needing to gain access to this private information, thereby preserving the privacy of the data subjects (e.g., individuals in City A), to which the data corresponds.

The use of non-interactive zero-knowledge (NIZK) proofs is a verifiable computation technique for verifying private digital data. However, embodiments of the present disclosure provide for novel methods of generating such proofs in a novel context (e.g., the verification of digital data produced from differentially-private queries). Additionally, embodiments of the present disclosure provide performance improvement over "conventional" NIZK proof schemes, as proofs generated by embodiments of the present disclosure are smaller (in terms of the amount of digital memory needed to express these proofs) than conventional NIZK proofs.

From a performance perspective, this means that proofs generated according to embodiments can be transmitted more quickly and efficiently over communication networks such as the Internet. Additionally, because of their smaller size, these proofs can be verified more quickly and efficiently by client computers. As a result, more individuals, such as the readers and data subjects, can participate in the process of verifying both the accuracy and security of differentially-private systems. Readers can study differentially-private data sets on their own, without the need for vetted data analysts. Additionally, readers can verify any results produced and published by vetted data analysts (or other readers) without needing access to the data set itself. Further, data subjects, or organizations representing data subjects, can verify that the differentially-private data set is truly private, and that their private data is not being leaked.

In some methods according to embodiments, after receiving an aggregation query from a client computer, a database computer can generate a query result, along with a proof (i.e., data that can be used to verify the digital data or record comprising the query response). In some embodiments, this proof may comprise a number of homomorphic commitments. These commitments can include, for example, a plurality of data record commitments, a plurality of predicate commitments, and a noise value commitment. The client computer can use the homomorphic property of the commitments to verify that the data contained in the query result is accurate, as described in further detail below. Before describing embodiments of the present disclosure in more detail, it may be helpful to describe some notation that may be used throughout this disclosure.

I. Notation

FIG. 1 shows a table detailing some notation and mathematical conventions used throughout this disclosure. This notation is summarized in Table 1 in FIG. 1.

A dataset stored in one or more databases may be referred to as D. This dataset may comprise one or more data records $x_i$. For example, D may comprise n data records $x_1$, $x_2$, ..., $x_n$. The data records $x_i$ can comprise any form of digital data, including, for example, private medical or financial records, which may include numerical data such as the age or weight of a patient, or the income level of an individual, or any other data which may be sensitive, and would therefore be subject to privacy considerations or regulations.

A generic database query on a database may be represented by q. Such a query may produce a query result that is numerically accurate given the data in the dataset D. For example, a query q such as "how many people in Chicago earn more than $100,000 per year?" may return a query result q(D) that comprises the exact number of data records $x_i$ corresponding to people who live in Chicago and earn more than $100,000 per year.

A differentially-private query on a database may be represented by q̃. A differentially-private query q̃ can comprise the sum of a query q and differentially-private noise $z(\epsilon,\delta)$ (also referred to as a "noise value"), which can be calculated using privacy parameters $\epsilon$ and $\delta$, i.e., q̃←q+$z(\epsilon,\delta)$. Due to the addition of the noise value $z(\epsilon,\delta)$, the differentially-private query result q̃(D) may not be exactly accurate given the data records $x_i$ in the dataset D. For example, if a dataset D contains 200,000 records for people in Chicago earning over $100,000 per year, a differentially-private query result may return a value such as 199,852, or 201,219 due to the addition of the noise value $z(\epsilon,\delta)$.

In addition to using the q and q̃ notation described above, queries may be represented semantically (e.g., "how many people in Chicago earn more than $100,000 per year?") or in a pseudo-query language (e.g., "SELECT COUNT(*) FROM DB WHERE Location=Chicago AND Income>$100,000"). A query may comprise one or more conditions or clauses. As an example, for the query "how many people in Chicago earn more than $100,000 per year?" there may be two conditions or clauses, i.e., "live in Chicago" and "earn more than $100,000 per year." As another example, for a query "how many people in Los Angeles have type 2 diabetes?" the conditions or clauses may comprise "live in Los Angeles" and "have type 2 diabetes."

Queries, including aggregation queries, can additionally comprise or identify one or more attributes (or fields). For example, the query "how many people in Los Angeles have type 2 diabetes?" implies a "location" attribute and a "diabetes status" attribute. In general, evaluating a query may involve identifying data records $x_i$ that satisfy the query's conditions based on their attributes. For example, identifying data records $x_i$ that have a "location" attribute or field equivalent to "Los Angeles" and a "diabetes status" attribute equivalent to "has type 2 diabetes." A database computer can evaluate such queries using predicate functions $\phi$ described below.

A predicate function $\phi$ can take a data record x as an argument and produce a predicate. Predicate functions $\phi$ can be used to evaluate data records in order to determine if those data records satisfy conditions or clauses defined by a query. For example, for a query such as "how many people in Chicago have type 2 diabetes?", a predicate function can be used to evaluate each data record $x_i$ in a dataset D in order to determine whether that data record $x_i$ corresponds to an individual that both lives in Chicago and has type 2 diabetes. In this case, the predicate (i.e., the output of the predicate function $\phi$) can comprise a Boolean value such as 1 ("TRUE") or 0 or ("FALSE"). For example, if a data record $x_i$ corresponds to an individual who lives in Chicago and has type 2 diabetes, the predicate function can produce the Boolean value "TRUE", whereas if a data record $x_i$ corresponds to an individual who does not live in Chicago and/or does not have type 2 diabetes, the predicate function can produce the Boolean value "FALSE." Table. 1 specifically shows a Boolean predicate function $\phi$, but embodiments can use other forms of predicate functions. For example, a predicate function $\phi$ can return a value on some other defined range, such as 0-100. Such predicate functions could be used to determine the results of queries such as "what is total income of individuals in Chicago?" or "What is the total 'fraudulence score' of credit card transactions over the last three months?"

Table 1 also shows an exemplary differentially-private linear counting query on Boolean predicates, expressed using the formula $\tilde{q}(D) \leftarrow \Sigma_i^n \phi(x_i) + z(\epsilon, \delta)$. This query formulation can be used to evaluate queries relating to the number of data records that satisfy some condition. For example, this formulation can be used to produce query results corresponding to queries such as "how many users have administrator access?" In this example, the Boolean predicate function $\phi$ can be applied to each data record $x_i$ in dataset D, returning a Boolean value 1 if the data record $x_i$ corresponds to a user with administrator access and returning a 0 otherwise. The sum of these predicates effectively comprises a count of the total number of users with administrator access. As such, the total number of users with administrator access can be determined by summing these predicates. Afterwards, differentially-private noise $z(\epsilon, \delta)$ can be added to this sum to produce the differentially-private query $\tilde{q}(D)$.

Additionally, Table 1 shows a commitment function c (sometimes presented as COM). This commitment function can be used to produce commitments (including additively homomorphic commitments) which can be part of the short NIZK proofs that enable a client computer to verify a differentially-private query result $\tilde{q}(D)$ (and other digital data records) in an efficient manner. A commitment of a data record $x_i$ may be referred to as a "data record commitment" or by $c_{data}$, $COM_{data}$, $c(x_i)$, $COM(x_i)$, etc. A commitment of a predicate $\phi(x_i)$ may be referred to as a "predicated commitment" or by $c_{pred}$, $COM_{pred}$, $c(\phi(x_i))$, $COM(\phi(x_i))$, etc. A commitment of a noise value $z(\epsilon, \delta)$ may be referred to as a "noise value commitment" or by $c_{noise}$, $COM_{noise}$, $c(z(\epsilon, \delta))$, $COM(z(\epsilon, \delta))$, etc.

II. Overview of Differentially-Private Query System

A differentially-private aggregation query evaluation and verification system according to some embodiments is summarized with reference to FIG. 2. The system can comprise any number of client computers (e.g., client computers 202, 218, and 220) operated by any number of clients, as well as a database computer 204 which manages any number of databases (e.g., databases 206, 222, and 224). Databases 206, 222, and 224 may be communicably coupled to the database computer 204. A dataset D can be stored on one of databases 206, 222, and 224, or distributed among databases 206, 222, and 224.

The client computers 202, 218, and 220 and the database computer 204 can communicate with one another over a communication network 226 (e.g., the Internet). In some embodiments, particularly if databases 206, 222, and 224 are implemented on external cloud database servers, the database computer 204 may also communicate with databases 206, 222, and 224 over communication network 226. Communication network 226 can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the sender computer 102 and the receiver computer 104 may be transmitted using a communication protocol, such as, but not limited to, File Transfer Protocol (FTP); Hypertext Transfer Protocol (HTTP); Secure Hypertext Transfer Protocol (HTTPS); Secure Socket Layer (SSL), ISO (e.g., ISO 8583) and/or the like.

In an exemplary method according to embodiments, at step 208, a client computer can transmit an aggregation query (in some embodiments, a differentially-private aggregation query) to database computer 204 via communication network 226. This aggregation query could comprise, for example "how many users (e.g., of a webservice such as a web forum) have administrator access?" or "SELECT COUNT(*) FROM DB WHERE AdminAccess=1" or any other appropriate formulation. The aggregation query can comprise one or more attributes (e.g., "AdminAccess").

At step 210, the database computer 204 can access a database 206 in order to retrieve or evaluate digital data records that are relevant to the aggregation query. In some embodiments, the database computer 204 can access multiple databases (e.g., databases 222 and 224) to retrieve or evaluate these data records. The database computer 204 can use the one or more attributes defined by the aggregation query to identify a plurality of digital data records corresponding to the aggregation query.

At step 212, the database computer 204 can determine the query result and generate proofs demonstrating that the query result was determined correctly. In some embodiments, the proofs can comprise a plurality of data record commitments corresponding to a plurality of digital data records and a plurality of predicate commitments.

At step 214, the database computer 204 can transmit the query result and proofs to the client computer 202.

At step 216, the client computer can verify any digital data or records comprising the query result using the transmitted proofs.

III. Proving Query Correctness Using Commitments

As stated above, the correctness of a query can be proven using verifiable computation techniques. These conventional techniques typically produce proofs with high time-complexity and memory complexity, which can take too much time to generate, transmit, and verify. This problem makes practical query verification for differentially-private queries somewhat infeasible.

Briefly, the time-complexity and memory complexity of methods and data is usually referenced based on a mathematical relationship based on the number of elements being operated on. In the context of database querying, this number of elements typically refers to the total number of data records $x_i$, denoted in the table of FIG. 1 as n. If the time complexity of a method is linear with respect to n, then doubling the total number of data records n doubles the amount of time it takes to perform some method (e.g., verifying a NIZK proof) corresponding to those data records $x_i$. If memory complexity of a method is quadratic (i.e., $n^2$) with respect to n, then doubling the number of elements n quadruples the memory size (e.g., in bytes) of some data (e.g., a NIZK proof) corresponding to those data records $x_i$.

Unfortunately, many NIZK proof systems achieve worse than linear time complexity and memory complexity (e.g., n log n complexity, quadratic ($n^2$) complexity, etc.), meaning that for large datasets (e.g., census, healthcare, transactional datasets, etc.), such conventional proofs can quickly become too large and too slow to process. However, as stated above, embodiments of the present disclosure provide for methods that can be used to produce short proofs, including linear memory complexity proofs and even sub-linear (e.g., logarithmic) memory complexity proofs. As a result, client computers can more quickly and easily verify digital data records and query results. As described in further detail below, this time and memory complexity improvement can result from some properties of aggregation queries that enable verification via homomorphic commitments. As such, it may be helpful to describe some characteristics of aggregation queries according to embodiments in more detail.

Generally, an aggregation query can satisfy a few conditions. One condition is that any clauses in the query can be evaluated on a per-data-record basis. For example, for a query "how many users have administrator access?", the query's clause ("have administrator access") can be evaluated on each individual data record, as typically, a user's administrator status is a property of that user's data record, and does not depend e.g., on the administrator status of other users. A database computer can evaluate the query's clauses on each individual data record using a predicate function $\phi$, producing a predicate that can indicate whether or not that data record corresponds to a user with administrator access.

A second condition for aggregation queries is that the output of an aggregation query can be determined by aggregated or combining one or more predicates. For example, such an aggregation could comprise a count, a sum, an average, etc. The result of an aggregation query "how many users have administrator access?" can be determined, generally, by first determining which users have administrator access (i.e., on a per-data-record basis), then summing or counting the total number of data records corresponding to users that satisfy the query's condition(s) as determined by the predicates produced using the predicate function $\phi$. As described in more detail below, these aggregation query conditions enable the verification of aggregation query results using homomorphic commitments.

Broadly, as defined above in the terms section, a commitment can comprise some value corresponding to a "committed" value or data, which does not reveal the committed value or data itself. Commitments can be useful for determining that processes or computations were executed correctly. For example, "computer A" can send a first commitment of a message to "computer B." The commitment does not give computer B enough information to determine the message. Later, computer A can send the message to computer B. Computer B can then use the message and a commitment function to generate a second commitment of the message. Computer B can then compare the first commitment of the message to the second commitment of the message. If the first commitment of the message and the second commitment of the message match, then computer B knows that the message it received from computer A corresponds to the received commitment. If the first commitment of the message and the second commitment of the message don't match, then computer B knows that computer A changed the message sometime after computer B received the first commitment of the message. In embodiments, data record commitments, predicate commitments, and a query result commitment can be used to determine (e.g., by a client computer) that the database computer correctly generated the query result corresponding to a query.

A commitment function (such as a hash function) can be used to generate a commitment based on some input. This input could comprise a data record $x_i$, or a particular value corresponding to the data record $x_i$, such as a predicate generated using a predicate function $\phi$ and the data record $x_i$. Preferably, a commitment function produces commitments that do not communicate any information about the input used to generate those commitments, thereby preventing entities from using commitments to learn anything about private input data.

In general terms, homomorphic commitments are commitments where relationships between commitments are the same as the relationships between the inputs of the corresponding commitment function. As an example, a commitment c of a sum (e.g., A+B+C) may be equal to a sum of commitments (e.g., c(A), c(B), c(C)), or expressed mathematically:

$$c(A + B + C) = c(A) + c(B) + c(C)$$

In embodiments of the present disclosure, a homomorphic commitment c of a predicate generated using a data record $x_1$ (i.e., $c(\phi(x_1))$) can equal a predicate $\phi$ generated using a homomorphic commitment c of a data record $x_1$ (i.e., $\phi(c(x_1))$). Expressed another way, $c(\phi(x_1))=\phi(c(x_1))$. This property enables homomorphic commitments to be used to verify that a database computer correctly evaluated the clauses or conditions defined by an aggregation query, without leaking any private digital data records. For example, for a query such as "how many users have administrator access?", predicate commitments (e.g., $c(\phi(x_1))$) and data record commitments (e.g., $c(x_1)$) can be used to verify that a database computer correctly identified the digital data records $x_1$ corresponding to users with administrator access, without requiring the database computer to identify any users with administrator access, or reveal specific data records $x_1$ corresponding to those users.

In slightly more detail, a database computer can provide a client computer with data record commitments $c_{data}=c(x_i)$) corresponding to data records stored in the database. For additional efficiency, these data record commitments $c_{data}$ can be generated and published prior to receiving an aggregation query from a client computer. Alternatively, these data record commitments $c_{data}$ can be stored in their own dataset in the database and can be freely queried by client computers in a non-differentially-private manner.

The database computer can also provide the client computer with predicate commitments $c_{pred}=c(\phi(x_i))$ corresponding to the predicate functions $\phi$ used to evaluate the client computer's differentially-private query $\tilde{q}$. As an example, the database computer can generate these predicate commitments $c_{pred}$ responsive to receiving the differentially-private query $\tilde{q}$ from the client computer.

To verify that the database computer correctly evaluated the clauses or conditions defined by the differentially-private aggregation query $\tilde{q}$, the client computer can use the data record commitments $c_{data}$ and a predicate function $\phi$ to produce a second set of predicate commitments $c_{pred2}$. If the second set of predicate commitments $c_{pred2}$ matches the predicate commitments $c_{pred}$ provided by the database computer, it may indicate that the database computer correctly evaluated the clauses or conditions defined by the aggregation query.

For additively homomorphic commitments, the sum of two commitments of predicates and a commitment of a differentially-private noise value (i.e., $c(\phi(x_1))$, $c(\phi(x_2))$, and $c(z(\epsilon,\delta)))$ is equal to a commitment of the sum of the predicates and the noise value, i.e., $$c(\phi(x_1)) + c(\phi(x_2)) + c(z(\epsilon, \delta)) = c(\phi(x_1) + \phi(x_2) + z(\epsilon, \delta))$$

As a consequence, this property enables homomorphic commitments to be used to verify that a database computer correctly aggregated the predicates to arrive at the differentially-private query result, without leaking any private data records. For example, for a query such as "how many users have administrator access?", predicate commitments $c_{pred}$ and a noise value commitment $c_{noise}=c(z(\epsilon,\delta))$ can be used to verify that a database computer correctly counted the data records $x_i$ corresponding to users with administrator access, without requiring the database computer to identify any users with administrator access.

In slightly more detail, for a "counting" aggregation query (e.g., "how many users have administrator access?"), the database computer can transmit one or more predicate commitments $c_{pred}$ and a noise value commitment $c_{noise}$ along with the query result $\tilde{q}(D)$ to a client computer. The client computer can generate a first query result commitment $c_{result1}=c(\tilde{q}(D))$ using a homomorphic commitment function c. The client computer can then sum the one or more predicate commitments $c_{pred}$ and the noise value commitment $c_{noise}$ to generate a second query result commitment $c_{result2}$. The client computer can compare the first query result commitment $c_{result1}$ to the second query result commitment $c_{result2}$. If the database computer correctly aggregated the predicates, these two query result commitments can be the same, e.g., $c_{result1}=c_{result2}$, by verifying the first query result commitment $c_{result1}$ and the second query result commitment $c_{result2}$ are the same, the client computer can confirm (in part) that the database computer correctly produced the query result $\tilde{q}(D)$.

In summary, a client computer can verify the correctness of an aggregation query result $\tilde{q}(D)$ using homomorphic commitments in two steps. In one step, the client computer can use one or more data record commitments $c_{data}$ and predicate commitments $c_{pred}$ to verify that the database computer correctly evaluated a predicate function p, indicating that the database computer correctly identified digital data records $x_1$ (e.g., data records corresponding to users with administrator access, etc.) that were relevant to the aggregation query. In another step, the client computer can use predicate commitments $c_{pred}$ and noise value commitments $c_{noise}$ to verify that the database computer correctly aggregated the predicates. This process can be used, with some variation, in exemplary methods accord to embodiments described in the sections below.

IV. Individual Data Record Commitment-Based Methods

As stated above in the summary, some embodiments of the present disclosure can be broadly categorized as individual data-record commitment-based aggregation query evaluation and verification methods (or non-vectorized aggregation query methods) and vectorized aggregation query methods. This section describes some non-vectorized aggregation query methods according to embodiments. More specifically, this section describes a non-vectorized aggregation query method, along with a non-vectorized aggregation query method that includes an additional technical improvement, referred to as "random subset verification."

This technique of random subset verification reduces the number of operations a client computer has to perform in order to verify a proof. However, it comes with a trade-off of slightly reducing the security of the aggregation query system, as it may become possible for the database computer to produce queries that appear correct, but are invalid. As an example, for a query such as "what is the HIV rate in Chicago?", a database computer could conceivably produce a query result that is "proven" correct, but is not actually correct.

The non-vectorized aggregation query methods according to embodiments can achieve linear performance scaling, meaning that as a hypothetical dataset grows in size, proofs used to verify the correctness of query results (and the correctness of data records stored in that data set) grow in size at the same rate. If for example, a 100 MB dataset is used to produce a 10 MB proof, it is expected that a 500 MB dataset would produce a 50 MB proof. This linear scaling is better than the "worse than linear" (e.g., quadratic) scaling present in many conventional NIZK proof methods.

The vectorized aggregation queries according to embodiments (described in further detail in Section V), typically achieve better than linear (e.g., logarithmic) performance scaling, meaning that the vectorized aggregation query methods typically out-perform non-vectorized aggregation query methods with regard to proof size. Still, there may be use cases and contexts in which the non-vectorized aggregation query methods are still useful, even if they are generally outperformed by the non-vectorized aggregation query methods. As one example, the non-vectorized aggregation query methods may be easier to implement into existing query systems, as they do not require implementing vector mathematics. Further, for small datasets, the performance difference between the vectorized aggregation query methods and non-vectorized aggregation query methods may be negligible. As a result, if a data scientist or database manager needs to quickly implement a provable aggregation query system for small datasets, the non-vectorized aggregation query methods may be more useful than the vectorized aggregation query methods, despite any differences in performance.

Figure 3:
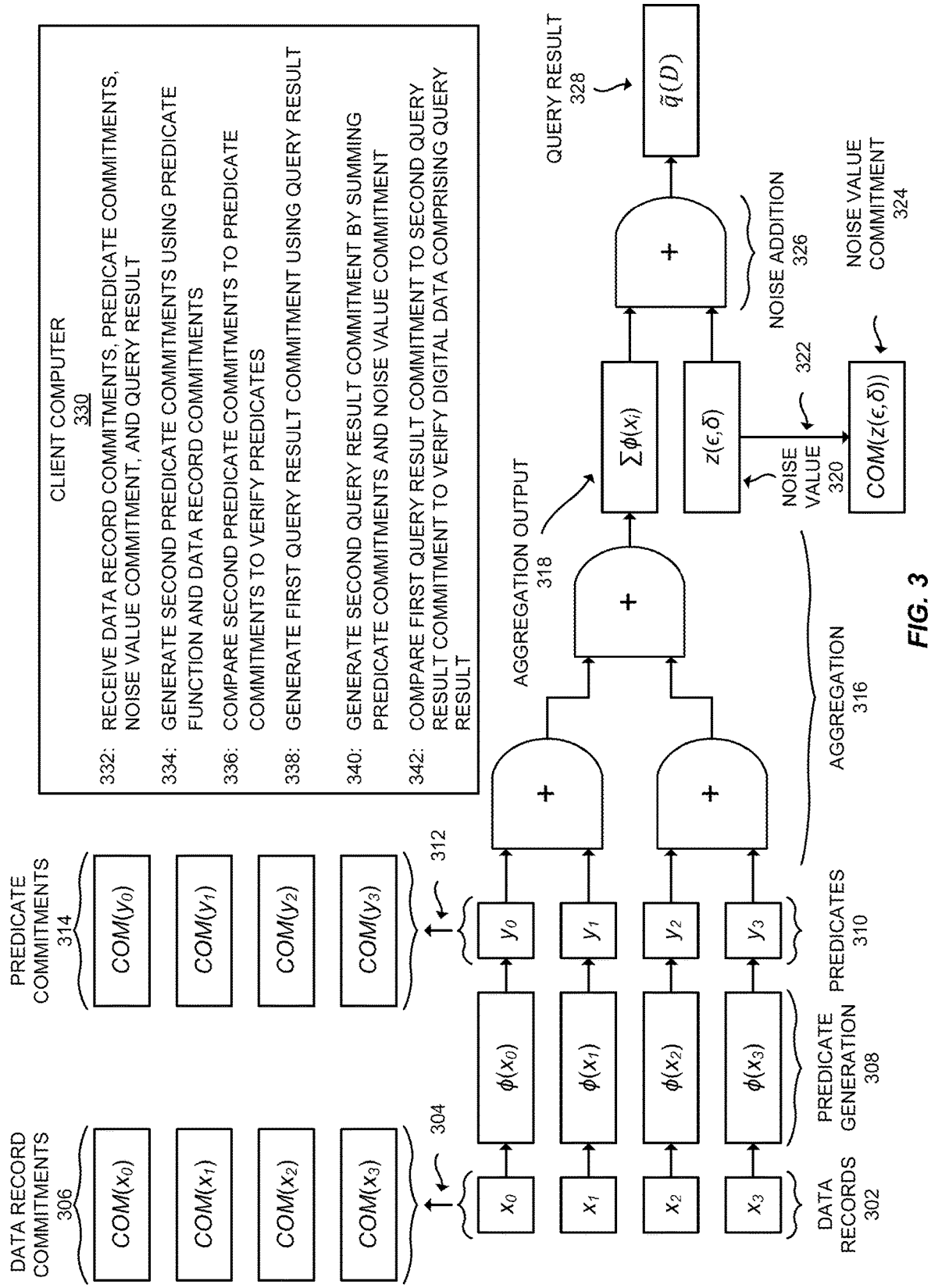
FIG. 3 illustrates a diagram corresponding to a method of aggregation query evaluation and digital data verification according to some embodiments.

FIG. 3 shows a diagram detailing some example steps performed by a database computer and a client computer 330 during an aggregation querying method (e.g., a differentially-private aggregation querying method) according to some embodiments. This method can involve the use of some of the query verification techniques described in Section III. FIG. 3 shows a manner in which a database computer can produce a query result q̃(D) 328 corresponding to a differentially-private linear counting query (e.g., "how many users have administrator access?"), and additionally shows how a client computer 330 can use the query result q̃(D) 328, along with data record commitments COM($x_i$) 306, predicate commitments COM($y_i$) 314, and a noise value commitment COM($z(\epsilon,\delta)$) 324 to verify both the data records $x_i$ 302 and the digital data comprising the query result q̃(D) 328.

The database computer can access data records $x_i$ 302 (e.g., data records corresponding to users) from a dataset D stored in one or more databases.

At step 304, using a commitment function (COM), the database computer can generate data record commitments COM($x_i$) 306. These data record commitments COM($x_i$) 306 can comprise part of a NIZK proof later sent to the client computer 330. The client computer 330 can use these data record commitments COM($x_i$) 306 to verify the integrity of the data records $x_i$ 302, and additionally verify the correctness of the query result q̃(D) 328. The database computer can perform step 304 prior to receiving any aggregation queries from the client computer 330 and can store the data record commitments COM($x_i$) 306 in a database, or otherwise publish the data record commitments COM($x_i$) 306 such that they can be accessed by the client computer 330. Generating and publishing the data record commitments COM($x_i$) 306 prior to receiving an aggregation query may be useful because it may reduce the number of operations that need to be performed during the course of generating an aggregation query result.

At step 308, after receiving an aggregation query from client computer 330, the database computer can determine or identify an appropriate predicate function φ that can be used to determine the query result q̃(D) 328. The database computer can determine the predicate function φ using the aggregation query. For example, the aggregation query can define one or more conditions or one or more clauses, and the database computer can use the one or more conditions or clauses to determine the predicate function φ. In more detail, the database computer can determine the predicate function φ such that the predicate function outputs a predicate (e.g., φ($x_i$)) comprising a Boolean value of one or TRUE if an input data record $x_i$ 302 satisfies the one or more conditions or the one or more clauses, and the predicate function outputs a predicate comprising a Boolean value of zero or FALSE if the input data record $x_i$ 302 does not satisfy the one or more conditions or one or more clauses.

For example, for a query such as "how many users have administrator access?" the database computer can determine a predicate function φ that returns a value of 1 ("TRUE") if a data record $x_i$ 302 corresponds to a user with administrator access, and return a value of 0 ("FALSE") if a data record $x_i$ 302 corresponds to a user without administrator access. As another example, for a query such as "how many people live in Chicago and earn more than $100,000 per year?" the database computer can determine a predicate function φ that returns a value of 1 ("TRUE") if a data record $x_i$ 302 corresponds to an individual who both lives in Chicago and earns over $100,000 per year, and return a value of 0 ("FALSE") if a data record $x_i$ 302 corresponds to an individual who does not live in Chicago or does not earn over $100,000 per year.

The database computer can use this predicate function φ to generate predicates (i.e., φ($x_i$) or more succinctly $y_i$) 310 using the data records $x_i$ 302 as inputs to the predicate function φ. These predicates $y_i$ 310 can later (e.g., in step 316) be aggregated to determine (in part) the query result q̃(D) 328.

At step 312, the database computer can use the commitment function COM to generate predicate commitments COM($y_i$) 314. These predicate commitments COM($y_i$) can comprise part of a NIZK proof later sent to the client computer 330. The client computer 330 can use these predicate commitments COM($y_i$) 314 to verify that the database computer correctly generated the predicates $y_i$ 310. Additionally, the client computer 330 can use the predicate commitments COM($y_i$) 314 to verify that the database computer correctly computed the query result q̃(D) 328.

Afterwards, at step 316, the database computer can determine an aggregation output 318. This aggregation output 318 may comprise a non-differentially-private query result q(D), e.g., a query result without added differentially-private noise. The database computer can determine the aggregation output 318 by performing an aggregation of the predicates $y_i$ 310. For a linear counting query, aggregating a plurality of predicates $y_i$ 310 may comprise determining a sum of the plurality of predicates, as indicated by the adder circuit at step 316. As another example, for an averaging aggregation query, the database computer can determine an average of the predicates $y_i$ 310. The result of step 316 can comprise aggregation output $\Sigma\phi(x_i)$ 318.

The database computer can additionally generate a (differentially-private) noise value $z(\epsilon,\delta)$ 320 using one or more privacy parameters δ,δ. This noise value $z(\epsilon,\delta)$ 320 can be added to the aggregation output 318 (e.g., at step 326) to produce the query result q̃(D) 328. Further, the database computer can generate a noise value commitment COM($z(\epsilon,\delta)$) 324 using the noise value $z(\epsilon,\delta)$ 320 and the commitment function.

The database computer can transmit the query result q̃(D) 328, the plurality of predicate commitments COM($y_i$) 314 and the noise value commitment COM($z(\epsilon,\delta)$) 324 to the client computer 330. The client computer 300 may be configured to use the plurality of data record commitments COM($x_i$) 306, the plurality of predicate commitments COM($y_i$) 314, and the predicate function φ to verify that the database computer correctly identified the plurality of data records $x_i$ 302 and correctly generated the plurality of predicate commitments COM($y_i$) 314. Further, the client computer 300 may be configured to use the query result q̃(D) 328, the plurality of predicate commitments COM($y_i$) 314 and the noise value commitment COM($z(\epsilon,\delta)$) 324 to verify that the database computer correctly generated the query result q̃(D) 328.

The client computer 330 can verify the query result using the techniques described above in Section III, and described in more detail below with reference to FIG. 5. As a brief summary, the client computer 330 can generate a second plurality of predicates commitments using the plurality of data record commitments COM($x_i$) 306 and the predicate function (e.g., at step 334). The client computer 330 can compare the second plurality of predicate commitments to the plurality of predicate commitments COM($y_i$) 314 to verify that they are equivalent (e.g., at step 336). If they are equivalent, the client computer 330 can determine that the database computer correctly identified data records 302 that are relevant to the aggregation query, and correctly applied the predicate function φ to those data records.

At step 338, the client computer 330 can generate a first query result commitment using the query result q̃(D) 328 and the commitment function, e.g., by inputting the query result q̃(D) 328 into the commitment function. At step 340, the client computer 330 can generate a second query result commitment by generating a sum of the plurality of predicate commitments $COM(y_i)$ 314 and the noise value commitment $COM(z(\epsilon,\delta))$ 324. In this way, the client computer 330 can use the homomorphic properties of the commitment function COM to verify the query result $\tilde{q}(D)$ 328. As described above in Section III, a sum of the predicate commitments $COM(y_i)$ 314 and the noise value commitment $COM(z(\epsilon,\delta))$ 324 should equal a commitment of the sum of the predicates $y_i$ 310 and the noise value $z(\epsilon,\delta)$ 320 (i.e., the query result $\tilde{q}(D)$ 328.

Consequently, at step 342, the client computer 330 can verify that the first query result commitment and the second query result commitment are equivalent. If they are, the client computer 330 can determine that the database computer correctly evaluated the aggregation query and produced a correct query result $\tilde{q}(D)$ 328.

In some embodiments, steps 332-342 may be modified in order to accomplish a random subset verification method. Such modifications are described in more detail below with reference to FIG. 5. In general, however, rather than generating second predicate commitments using all the data record commitments $COM(x_i)$ 306, the client computer 330 can randomly sample a subset of the data record commitments $COM(x_i)$ 306 and only verify the predicate commitments $COM(y_i)$ 314 corresponding to the random subset. In this way, the client computer 330 can reduce the number of predicate commitments to be verified, increasing the efficiency of the verification process. However, there is some non-negligible chance that the database computer generated an incorrect query result $\tilde{q}(D)$ 328 that passes the client computer's 330 verification process.

Figure 4:
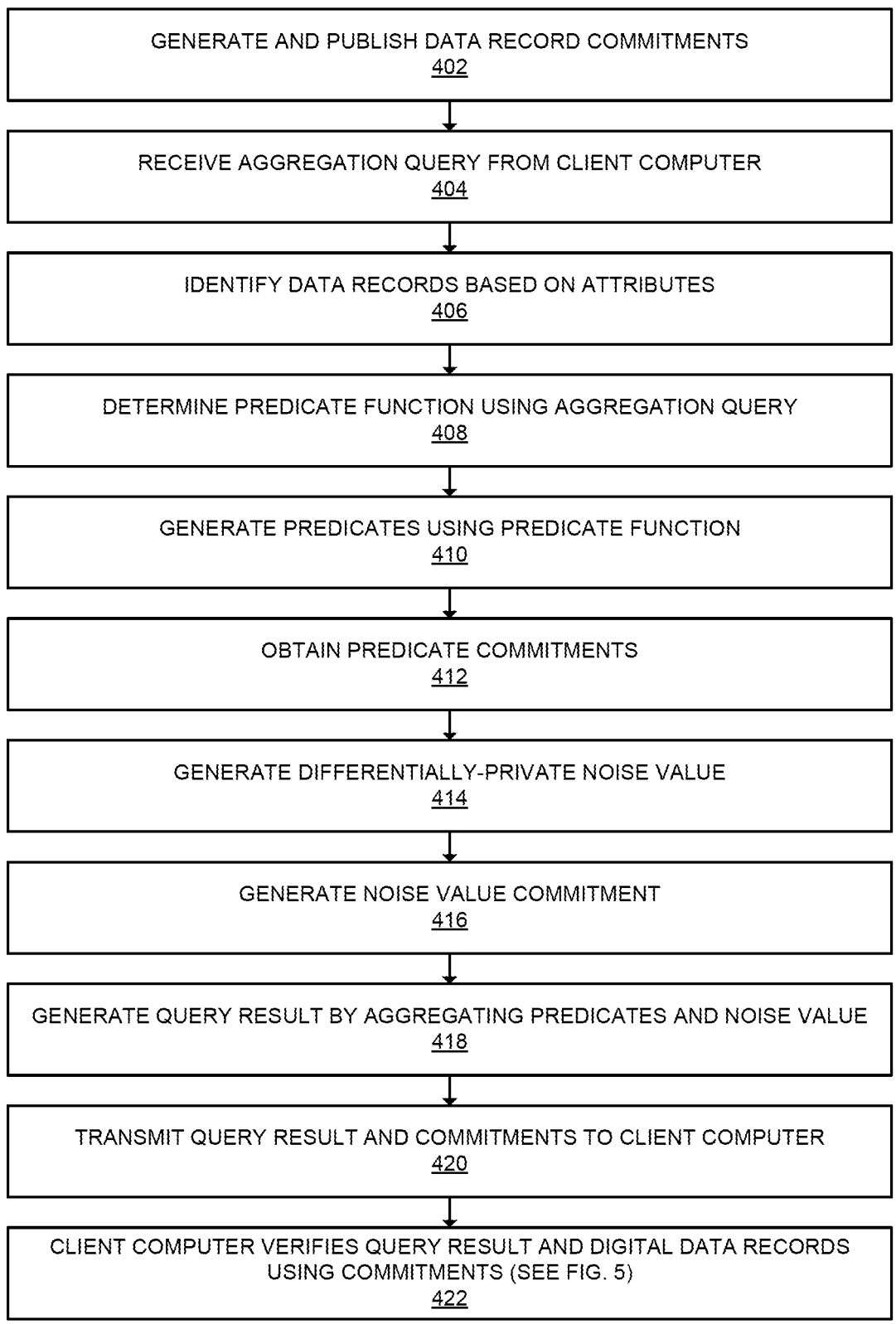
FIG. 4 illustrates a flowchart of a method for evaluating differentially-private aggregation queries according to some embodiments.

This example method is described in more detail with reference to FIG. 4, which shows a flowchart of a method for servicing differentially-private aggregation queries according to some embodiments.

At step 402, the database computer can generate and publish a plurality of data record commitments corresponding to a plurality of digital data record. The database computer can publish the plurality of data record commitments such that client computers can access the plurality of data record commitments. For example, the database computer may publish the plurality of data record commitments by transmitting them to a plurality of client computers, by uploading them to a publicly accessible hosting server, or via any other appropriate means. In some embodiments, the database computer may provide the plurality of data record commitments to a client computer in a later step, and thus step 402 may be optional. This plurality of data record commitments can be configured to enable a client computer to verify an aggregation query result. The plurality of data record commitments may comprise additive or fully homomorphic commitments generated using a commitment function.

At step 404, the database computer can receive an aggregation query from a client computer. The aggregation query can conform to any appropriate syntax, structure, or language. For example, the aggregation query may comprise an SQL-style query. The aggregation query may identify one or more attributes. For example, for a query such as "how many users have administrator access and are based in California?" the attributes may comprise the administrator status of users corresponding to data records, and the locations of users corresponding to data records. In many conventional database configurations, these attributes may correspond to columns in a data table. The aggregation query may also define one or more conditions or clauses. For example, for the query "how many users have administrator access and are based in California?" the conditions or clauses may comprise the specific location of "California" and an administrator status of true. These conditions or clauses can later be used by the database computer to identify a predicate function, which can be used by the database computer to evaluate digital data records stored in the database in order to determine if they satisfy the conditions or clauses.

At step 406, the database computer can identify a plurality of digital data records stored in the database based on the one or more attributes. This database may be communicably coupled to the database computer. The plurality of data records may comprise data records that are relevant to the aggregation query. For example, a database may comprise data records corresponding to users, as well as data records corresponding to scientific experiments. For a query such as "how many users have administrator access?" the data records corresponding to scientific experiments may be irrelevant. As such, the database computer may identify the data records corresponding to users using the attributes (e.g., administrator access status) defined by the aggregation query. In some embodiments, step 406 may comprise identifying a data table from the database that comprises the plurality of data records.

At step 408, the database computer can determine a predicate function using the aggregation query. This predicate function can comprise a function used to evaluate whether data record satisfy one or more conditions or one or more clauses defined by the query. For example, for a query such as "how many users have administrator access?" the database computer can determine a predicate function such that the predicate function outputs a predicate comprising a Boolean value of one or "TRUE" if an input data record satisfies the one or more conditions or one or more clauses (e.g., if an input data record corresponds to a user with administrator access) and outputs a predicate comprising a Boolean value of zero or false if the input data record does not satisfy the one or more conditions or clauses (e.g., if an input data record does not correspond to a user with administrator access).

At step 410, the database computer can generate a plurality of predicates using the plurality of data records and the predicate function. The database computer can generate this plurality of predicates by inputting each data record into the predicate function. The predicates can comprise the resulting outputs of the predicate function, which can comprise Boolean values as stated above. As an alternative, the predicates can comprise non-Boolean values on a defined range (e.g., 0-100). For example, if the aggregation query was "what is the average credit score of users in Atlanta?" the predicates may comprise credit score values produced using the plurality of data records and a predicate function.

At step 412, the database computer can obtain a plurality of predicate commitments generated using a commitment function. The predicate commitments may comprise additively homomorphic or fully homomorphic commitments and the commitment function may comprise the same commitment function used to generate the data record commitments at step 402. In some embodiments, the database computer can generate the plurality of predicate commitments using the plurality of predicates and the commitment function, e.g., by inputting the plurality of predicates into the commitment function. In many cases, the database computer can generate the plurality of predicate commitments after receiving an aggregation query from the client computer (e.g., at step 404) because the predicate function (and therefore the predicates) may be dependent on conditions or clauses defined by the aggregation query. However, in some cases the database computer may receive aggregation queries comprising common conditions or clauses, and as such, the database computer may reuse predicate commitments generated using prior aggregation queries. The plurality of predicate commitments can be configured to enable the client computer to verify the query result. More specifically, the client computer can use the plurality of data record commitment and the plurality of predicate commitments to verify that the database computer correctly determined and evaluated the predicate function, as well as use the plurality of predicate commitments to verify that the database computer correctly generated the query result, as described in more detail below with reference to FIG. 5.

At step 414, the database computer can generate a noise value using one or more privacy parameters. This may comprise a differentially-private noise value $z(\epsilon,\delta)$ generated using privacy parameters $\epsilon$, $\delta$ as described above. By adding a differentially-private noise value to a query result, the aggregation query system can achieve differential privacy, thereby protecting potentially sensitive or private digital data records stored in the database. The privacy parameters $\epsilon$, $\delta$ can control aspects of the noise value. For example the parameter E can control the maximum difference between a differentially-private query result and a corresponding non-differentially-private query result, and the parameter $\delta$ can control the probability of sensitive information being leaked.

At step 416, the database computer can generate a noise value commitment (based on the noise value) using the commitment function. The commitment function may comprise the same commitment function used to generate the data record commitments and the predicate commitments. The noise value commitment may comprise an additively homomorphic or fully homomorphic commitment. Later, a client computer can use the noise value commitment to verify that the database computer correctly generated the query result, e.g., by adding the noise value to the query result.

At step 418, the database computer can aggregate the plurality of predicates and the noise value to generate a query result. This query result can comprise the digital data requested by the client computer via the aggregation query. The specific function or process used to aggregate the plurality of predicates and the noise value may depend on the nature of the aggregation query. For example, for a linear counting query such as "how many users have administrator access?" aggregating the plurality of predicates and the noise value to generate the query result may comprise generating a sum of the plurality of predicates and the noise value, and the query result may comprise this sum. As another example, for a query such as "what percentage of users have administrator access?" aggregating the plurality of predicates and the noise value to generate the query result may comprise generating a sum of the plurality of predicates and the noise value, then dividing the sum by the total number of predicates, wherein the query result comprises the resulting quotient.

At step 420, the database computer can transmit the query result, the plurality of predicate commitments and the noise value commitment to the client computer. The plurality of predicate commitments and the noise value commitment (and the plurality of data record commitments generated and published at step 402) may be configured to enable verification of the query result. The database computer can transmit the query result and the commitments to the client computer via any appropriate means, such as via a network such as the Internet.

The client computer may be configured to use the plurality of data record commitments, the plurality of predicate commitments, and the noise value commitment to verify the query result.

At step 422 the client computer can perform this verification process. The client computer can use the plurality of data record commitments, the plurality of predicate commitments and the predicate function to verify that the database computer correctly identified the plurality of digital data records and correctly generated the plurality of predicate commitments. Additionally, the client computer can use the query result, the plurality of predicate commitments, and the noise value commitment to verify that the database computer correctly generated the query result.

This verification process is described in more detail below with reference to FIG. 5.

Figure 5:
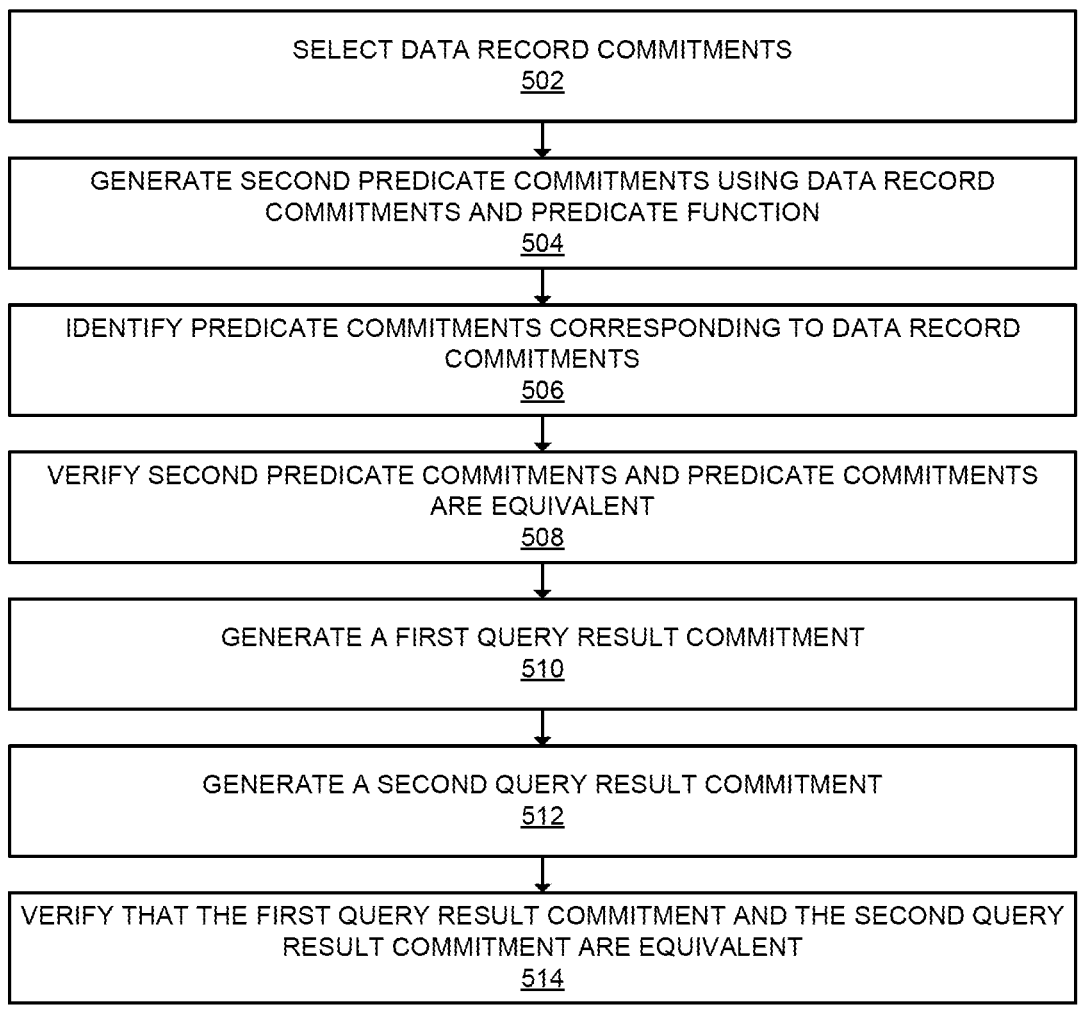
FIG. 5 illustrates a flowchart of a method for verifying the correctness of aggregation queries and digital data records according to some embodiments

Referring to FIG. 5, at step 502 the client computer can select data record commitments to verify. In some embodiments, these data record commitments may include all relevant data record commitments published by the database computer (i.e., the plurality of data record commitments). However, in some embodiments, the client computer can use a random subset verification method. In such embodiments, the client computer can randomly select a sample of data record commitments. The sample of data record commitments can comprise less data record commitments than the plurality of data record commitments. Rather than e.g., verifying that the plurality of data record commitments and the corresponding predicate commitments are correct, the client computer can verify this smaller sample, reducing the number of verification operations that can be performed, thereby increasing the speed and efficiency of the verification process.

At step 504, the client computer can generate second predicate commitments using the data record commitments and the predicate function. In some embodiments, the client computer can generate a second plurality of commitments using the plurality of data record commitments and the commitment function. In others, particularly those in which the client computer performs random subset verification, the client computer can generate a second sample of predicate commitments using the sample of data record commitments and the predicate function. The second sample of predicate commitments can comprise less predicate commitments than the plurality of predicate commitments. Due to the homomorphic nature of the commitment function, the second predicate commitments should generally equal the predicate commitments received from the database computer. As a consequence, comparing the second predicate commitments and the predicate commitments is a technique that can be used to verify that the database computer correctly evaluated the aggregation query.

At step 506, the client computer can identify predicate commitments corresponding to the data record commitments (e.g., those selected at step 502). In some embodiments, these identified predicate commitments can comprise the plurality of predicate commitments received from the database computer. In others, particularly those in which the client computer performs random subset verification, the client computer can select a sample of predicate commitments from the plurality of predicate commitments. The sample of predicate commitments can correspond to the sample of data record commitments (e.g., can correspond to predicates generated using data records that were also used to generate data record commitments in the sample of data record commitments), and can comprise less predicate commitments than the plurality of predicate commitments.

At step 508, the client computer can verify that the second predicate commitments and the predicate commitments are equivalent. This can comprise verifying that the second plurality of predicate commitments and the plurality of predicate commitments are equivalent, or (in random subset verification methods) can comprise verifying that the second sample of predicate commitments and the sample of predicate commitments are equivalent. In doing so, the client computer can verify that the database computer correctly identified digital data records that correspond to the aggregation query, and correctly applied the predicate function to those digital data records.

Having verified that the database computer correctly identified the digital data records and applied the predicate function, the client computer can now verify that the database computer correctly determined the query result (e.g., correctly aggregated the predicates and the noise value). At step 510, the client computer can generate a first query result commitment using the query result and the commitment function, e.g., by inputting the query result into the commitment function. At step 512, the client computer can generate a second query result commitment by generating a sum of the plurality of predicate commitments, and the noise value commitment. The second query result commitment can comprise the sum.

At step 514, the client computer can verify that the first query result commitment and the second query result commitment are equivalent. Due to the homomorphic nature of the commitment function, the first query result commitment and the second query result commitment can be equivalent if the database computer correctly evaluated the aggregation query. In this way, the client computer can verify that the database computer correctly evaluated the aggregation query and produced an accurate query result.

As a result of the random subset verification method, in order to verify the query result and the plurality of data records, the client computer only needs to verify a sample of k predicate commitments, rather than all n predicate commitments as in other embodiments of the present disclosure. However, as demonstrated by the formula below, the random subset verification method does not have a 100% probability of successfully verifying the differentially-private query result q̃(D) or the digital data records.

$$Pr\left[\tilde{q}(D) \neq \sum_{i}^{n} \phi(x_i) + z(\epsilon, \delta) \wedge V = \text{accept}\right] \geq \frac{\binom{n-k}{1}}{\binom{n}{1}} = \frac{n-k}{n}$$

As indicated by the formula above, the probability that the database computer "proves" the correctness of the predicate commitment, but can still "cheat" (e.g., does not correctly evaluate the query) is approximately.

$$\frac{n-k}{n}.$$

As such, while the proof size is smaller than the non-random methods described above, random subset verification methods may not be useful in use cases where higher security is needed. Still, in low-security use cases, or in cases where there is high established trust between client computers and the database computer, the random subset verification method may be an effective way to further reduce the proof size, thereby improving the speed and efficiency at which proofs can be transmitted over networks such as the Internet, and improving the rate at which client computers can verify said proofs, thereby verifying the results of differentially-private aggregation queries and digital data records.

V. Vectorized Aggregation Query Methods

The use of homomorphic commitments on individual data records (as described above) to prove the correctness of aggregation queries can comprise an improvement over conventional techniques involving the use of verifiable computation. This is because using homomorphic commitments as proofs generally scales the proof size linearly with the number of data records in the dataset D, whereas verifiable computation typically achieves worse than linear scaling. Further performance improvements can be achieved by evaluating queries and proofs using vector-based techniques, as described below.

The use of vector operations and vectorized proofs has additional efficiency benefits over conventional verifiable computation techniques. Using the "Bulletproofs" proving system (described in [1]), the correctness of the inner product of two vectors of length n can be proven with a proof of size O(log n). Expanding on these techniques, the correctness of k inner product operations of vectors of length n can be proven with a proof of size O(log n+k). In this way, the use of vector operations can lead to better than linear performance in proof size. This is an improvement over verifiable computation, which typically involves proving every stage of a computation, and typically achieves worse than linear performance in proof size.

A. Vector Operations Over Predicates

Generally, aggregation queries, such as counting queries, can be reinterpreted as vector operations between predicate vectors and an "all ones vector," a vector where each element is the number 1. These vector operations can include "inner product" operations. An inner product operation generally refers to a variety of operations involving elementwise multiplication of vectors. For example, the "dot product" is an inner product operation on two vectors a and b, defined by the formula $a \cdot b = \Sigma a_i \cdot b_i$. While a predicate can comprise a single value corresponding to a data record, a predicate vector can comprise a vector of predicates corresponding to a vector of data records. This property is illustrated by FIGS. 6A-6D.

Figure 6:
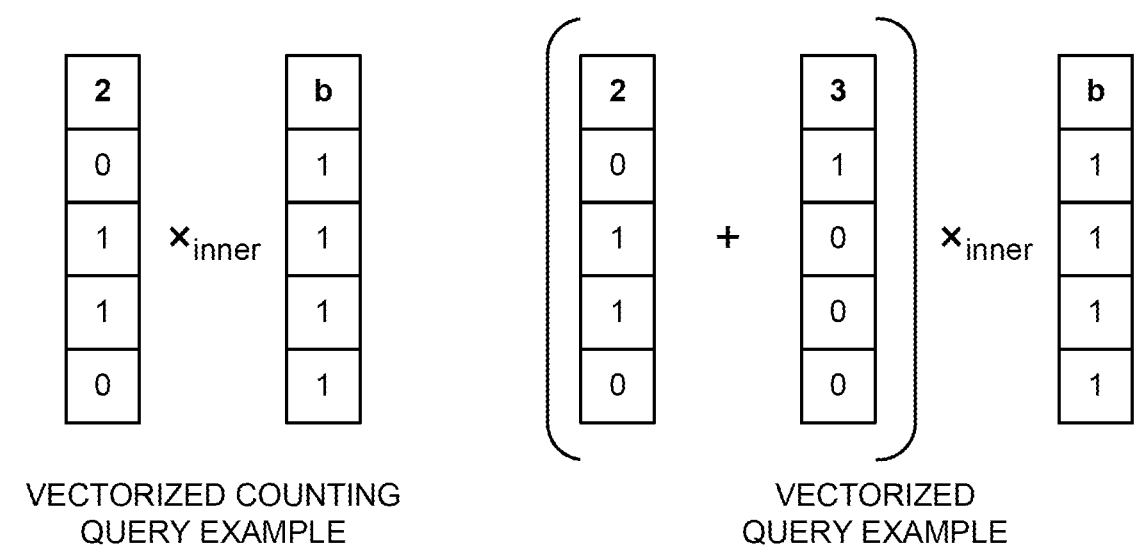
FIGS. 6A-6D illustrate several examples of vector forms of aggregation queries and the evaluation of aggregation queries using vector operations.

FIG. 6A shows an exemplary dataset 602, comprising four data records $x_1$, $x_2$, $x_3$, $x_4$. Each data record can comprise three attributes $A_1$, $A_2$, $A_3$. FIG. 6A also shows a one hot encoding 604 of the example data 602. The one hot encoding form of the example data 604 can be useful because it can enable queries to be evaluated using vector operations, as demonstrated with reference to FIGS. 6B-6D and FIG. 7. Each column of the one hot encoded tables can be interpreted as a data vector. By adding, subtracting, and calculating the inner product of data vectors, the database computer can determine query results.

FIG. 6B demonstrates how the result of a linear counting query can be determined using the inner product operation. If a database computer is queried to return the number of data records for which Attribute 1=2 (e.g., after receiving a query from a client computer such as "SELECT COUNT(*) FROM DB WHERE Attribute1=2"), it can calculate the inner product (in this case, the dot product) of the "2"

column of Attribute 1 with an all ones vector. The result, 2, comprises the total number of data records that satisfy the query.

This technique can be combined with other techniques to enable the evaluation of more complex aggregation queries. FIG. 6C demonstrates an aggregation query that request the total number of data records for which Attribute 1=2 or Attribute 1=3 (e.g., corresponding to an aggregation query from a client computer such as "SELECT COUNT(*) FROM DB WHERE 1<Attribute1"). In this case, the column vectors corresponding to Attribute 1=2 and Attribute 1=3 can be summed before calculating the inner product (in this case, the dot product) with the all ones vector. Because the attributes are one-hot encoded, the result of the vector sum effectively comprises a vector for which Attribute 1=2 or Attribute 1=3. Calculating the inner product with the all ones vector produces a result of 3, the total number of data records that satisfy the aggregation query.

Conjunctive queries (e.g., queries involving the "AND" of multiple clauses or conditions) can also be evaluated using vector operations. FIG. 6D demonstrates an aggregation query that requests the total number of data records for which Attribute 1=2 and Attribute 2=1 and Attribute 3=2 (e.g., corresponding to an aggregation query from a client computer such as "SELECT COUNT(*) FROM DB WHERE Attribute1=2 AND Attribute2=1 AND Attribute3=2"). This query can be evaluated by performing an inner product (e.g., an elementwise multiplication) between the column vectors corresponding to Attribute 1=2 and Attribute 2=1, then performing an inner product (e.g., a dot product) between the resulting vector and the column vector corresponding to Attribute 3=2. The result, 0, corresponds to the total number of data records that satisfy the query.

B. Disjunctive Queries

Disjunctive queries (e.g., queries involving the "OR" of multiple clauses or conditions) can also be evaluated using vector operations. This is in part due to the fact that disjunctive relationships can be expressed in terms of conjunctive relationships. For example, A OR B can be calculated as A+B−(A AND B), or expressed using standard notation $A \vee B = A+B - A \wedge B$.

Figure 7:
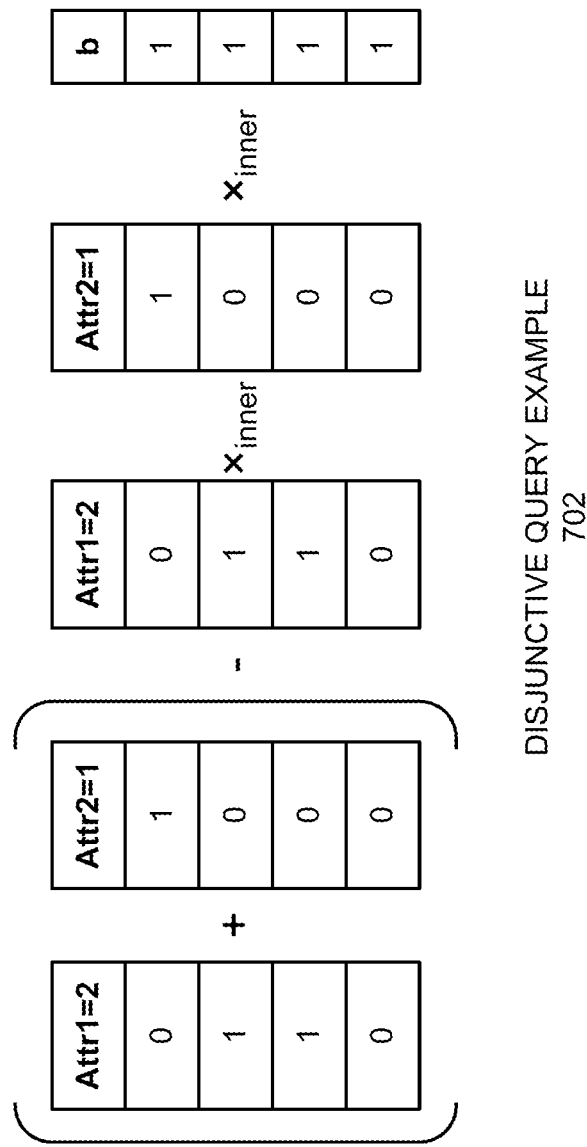
FIG. 7 illustrates an example of a vector form of a disjunctive query and the evaluation of the disjunctive query using vector operations.

FIG. 7 illustrates the evaluation of a disjunctive query using vector operations. FIG. 7 can correspond to an aggregation query that requests the total number of data records for which Attribute 1=2 or Attribute 2=1 (e.g., "SELECT COUNT(*) FROM DB WHERE Attribute1=2 OR Attribute2=1"). The database computer can first calculate the sum of the one hot encoded vectors corresponding to Attribute 1=2 and Attribute 2=1. The database computer can then calculate the inner product (e.g., elementwise multiplication) of the vector corresponding to Attribute 1=2 and Attribute 2=1 (effectively determining the AND of these two conditions). After subtracting the sum vector from the element-by-element product vector, the database computer can calculate the inner product (e.g., the dot product) of the result with the all ones vector. This result, 3, corresponds to the total number of data records that satisfy the query.

C. Conjugate Normal Form

Because most queries comprise conjunctive and disjunctive relationships between conditions or clauses, it is possible to use the vector evaluation techniques described above with reference to FIGS. 6A-6D and FIG. 7 to evaluate effectively arbitrary aggregation queries. A database computer can accomplish this using a "vector operation form" of an aggregation query, which can include a 3-CNF form (conjugate normal form in which each clause has at most three sub-clauses).

Figure 8:
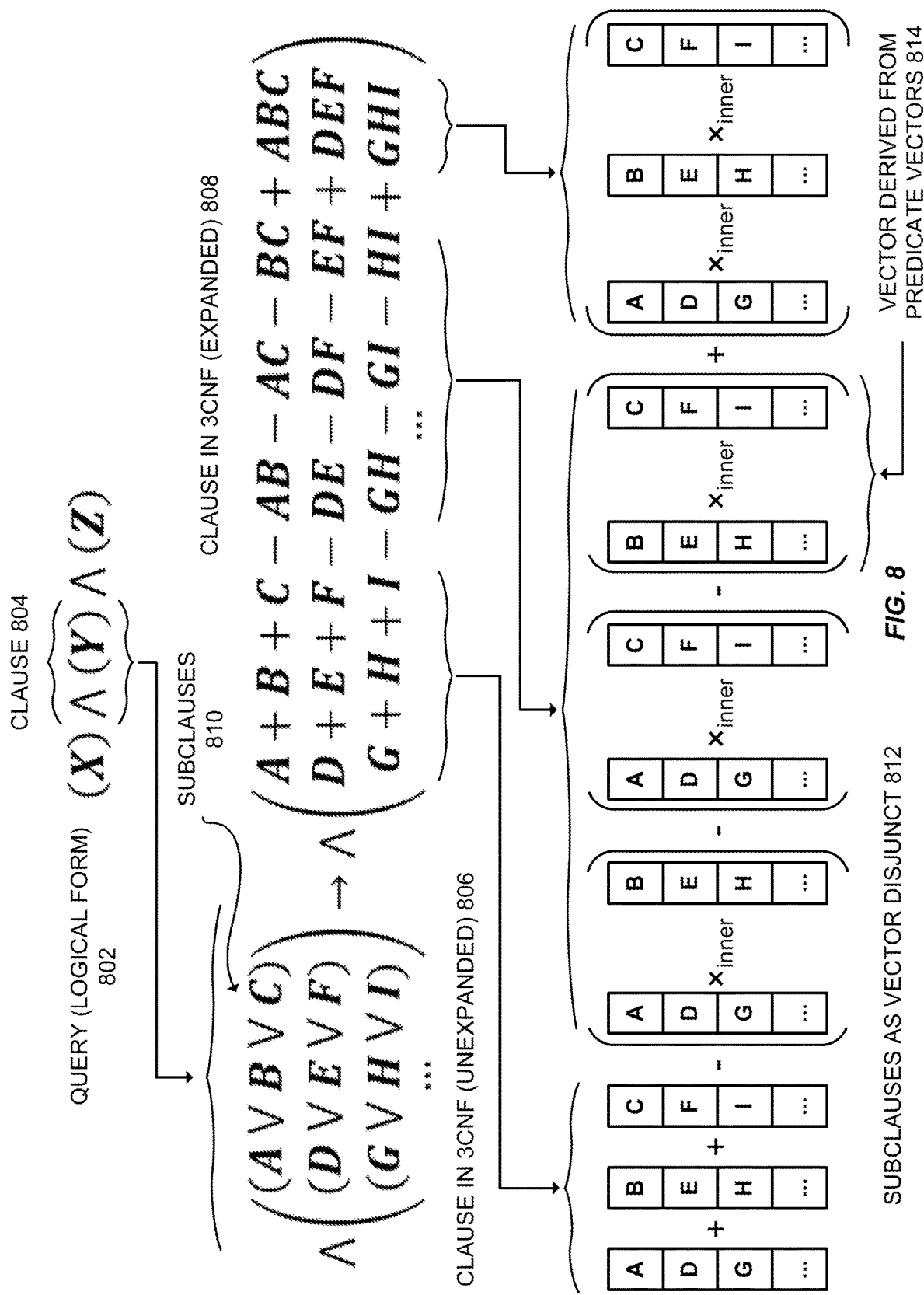
FIG. 8 illustrates an example of a three conjunctive normal form (3-CNF) of a vectorized aggregation query according to some embodiments.

FIG. 8 illustrates techniques that a database computer can use to perform this evaluation. In FIG. 8, an example arbitrary query is presented in logical form 802 as a conjunction of three clauses (X), (Y), and (Z), including clause 804. The database computer can represent or reinterpret each clause in 3-CNF. FIG. 8 shows clause 804 expressed in an unexpanded 3-CNF 806, as a vector of disjunctions (e.g., $(A \vee B \vee C)$) of subclauses 810, represented by the letters A→I. The unexpanded clause in 3CNF 806 can be expanded to produce expanded clause in 3CNF 808, e.g., by expressing the subclauses 810 as sums and differences of inner products of the subclauses. This can be expressed in a "vector operation form" more similar to the disjunctive query in FIG. 7, i.e., indicated in FIG. 8 as the subclauses as a vector disjunct 812.

As described above, a database computer can evaluate the vector disjunct 812 using vector operations, including the inner product, vector addition and vector subtraction. The database computer can perform this process for each of the clauses (e.g., (X), (Y), and (Z)), then determine the conjugation of the "clause results," e.g., using vectorized techniques described above with reference to FIG. 6D, e.g., the application of inner product operations. In some cases, the database computer can determine, calculate, or generate vectors derived from the predicate vectors (e.g., vector derived from predicate vectors 814) which can subsequently be used to complete the evaluation of the vector operation form of the aggregation query. Once the database computer has evaluated each clause and determined the conjugation of the clause results, the database computer can determine an inner product (e.g., a dot product) of the conjugation of the clause results and an "all ones" vector to produce a final count or aggregation of the number of data records that satisfy the query.

In order to prove that the database computer correctly evaluated the aggregation query, the database computer can prove that it correctly evaluated the logical form 802 of the query, e.g., the subclauses as vector disjuncts 812 corresponding to each clause (e.g., clause 804). The database computer can use the Bulletproofs proving system (described in [1]) to generate vector proofs that grow logarithmically with the size (e.g., the number of elements in) each individual predicate vector and grow linearly with the number of inner product operations. For most aggregation queries, the number of elements in the predicate vectors will be larger than the number of inner product operations. As such, in practical terms, these vector proofs are logarithmic with respect to the number of elements in the predicate vectors, which is proportional to the number of data elements in the dataset. Consequently, these vector proofs are smaller than the proofs generated using conventional verifiable computation systems, meaning they can be transmitted more efficiently over networks such as the Internet, and can be evaluated more quickly and efficiently by client computers.

D. Aggregation Query Evaluation

Figure 9:
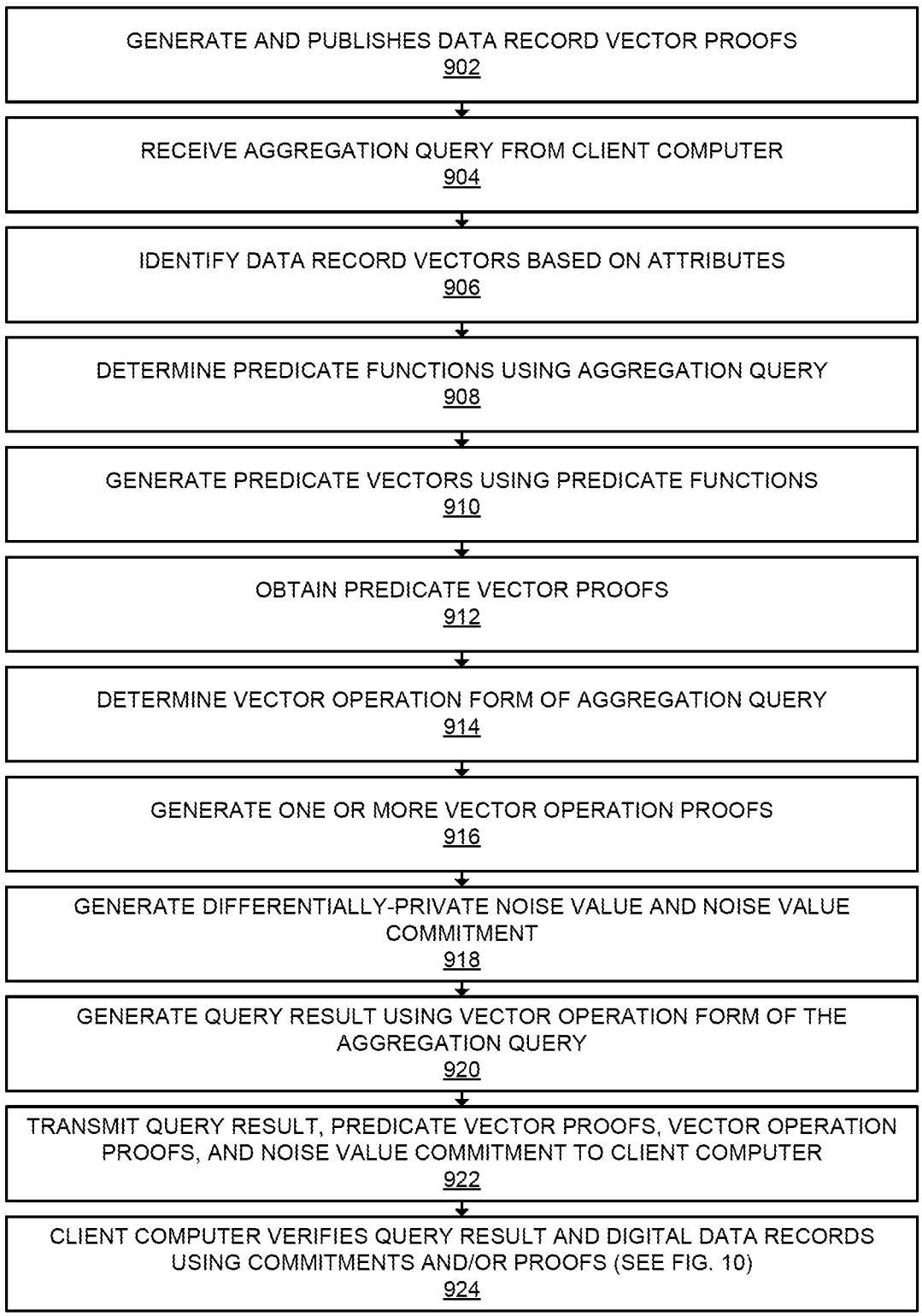
FIG. 9 illustrates a flowchart corresponding to a vector-based method of aggregation query evaluation according to some embodiments.

FIG. 9 illustrates a flowchart corresponding to a vector-based method of aggregation query evaluation according to some embodiments. Vectorized methods of evaluating and verifying aggregation queries are described below with reference to FIG. 9, which shows a flowchart of a method for servicing differentially-private aggregation queries according to some embodiments.

At step 902, the database computer can generate and publish one or more data vector proofs, such that the one or more data vector proofs can be accessible to the client computer. For example, the database computer may publish the one or more data vector proofs by transmitting them to a plurality of client computers, by uploading them to a publicly accessible hosting server, or via any other appropriate means. In some embodiments, the database computer may provide the one or more data vector proofs to a client computer in a later step (e.g., step 922) and thus step 902 may be optional. The one or more data vector proofs can be configured to enable verification of query results generated by the database computer. The data record vector proofs may comprise additive or fully homomorphic commitments generated using a commitment function. For comparison, while a data record commitment (as described in Section IV) may comprise a commitment of a single digital data record, a data vector commitment (proof) may comprise a commitment of a vector comprising multiple digital data records.

At step 904, the database computer can receive an aggregation query from a client computer. The aggregation query can conform to any appropriate syntax, structure, or language. For example, the aggregation query may comprise an SQL-style query. The aggregation query may identify one or more attributes. For example, for a query such as "how many users have administrator access and are based in California?" the attributes may comprise the administrator status of users corresponding to data records and the locations of users corresponding to data records. In many conventional database configurations, these attributes may correspond to columns in a data table. The aggregation query may also comprise one or more query clauses, which may, in some cases, be referred to as sub-clauses. For example, for a query such as "how many users have administrator access and are based in California?" there are two clauses, one corresponding to the administrator access status of a user and one corresponding to a user's location. The aggregation query may comprise a conjunction (e.g., an "AND") of these two clauses.

At step 906, the database computer can identify one or more data record vectors based on the one or more attributes. The one or more data record vectors may comprise vectors of digital data records that are relevant to the aggregation query. For example, a database (communicably coupled to the database computer) may comprise digital data records corresponding to users, as well as data records corresponding to scientific experiments. For a query such as "how many users have administrator access?" the data records corresponding to scientific experiments may be irrelevant. As such, the database computer may identify the data records corresponding to users using the attributes (e.g., administrator access status) defined by the aggregation query. In some embodiments, step 906 may comprise identifying a data table from the database containing the one or more data record vectors. The one or more data record vectors may be encoded using one hot encoding. As described above with reference to FIGS. 6A-6D, FIG. 7, and FIG. 8, the use of one hot encoding may enable the aggregation query to be evaluated as a sequence of vector operations, including vector product operations, this may further enable the use of proof systems such as Bulletproofs [1], which enable a prover (e.g., the database computer) to efficiently prove that they correctly evaluated vector operations including inner product operations.

At step 908, the database computer can determine one or more predicate functions corresponding to the one or more query clauses using the aggregation query. These predicate functions can comprise functions used to evaluate whether data records in data record vectors satisfy any conditions or clauses defined by the query. For example, for a query such as "how many users have administrator access?" the database computer can determine a predicate function that takes a data record vector as an input and returns a predicate vector comprising Boolean values, i.e., ones or "TRUES" if digital data records in the data record vector satisfy the conditions or clauses (e.g., if a data record corresponds to a user with administrator access) and zeros or "FALSES" if digital data records in the data record vector do not satisfy the conditions or clauses (e.g., if a data record does not correspond to a user with administrator access).

At step 910, the database computer can generate one or more predicate vectors based on the one or more data record vectors and one or more predicate functions corresponding to the one or more query clauses. The database computer can generate these one or more predicate vectors by inputting each data record vector into the one or more predicate functions. The predicate vectors can comprise the resulting outputs of the predicate function, which can comprise Boolean values as stated above. As an alternative, the predicate vectors can comprise vectors of non-Boolean values on a defined range (e.g., 0-100). For example, if the aggregation query was "what is the average credit score of users in Atlanta?" the predicate vectors may comprise vectors of credit score values produced using the one or more data record vectors and the predicate function.

At step 912, the database computer can obtain one or more predicate vector proofs based on the one or more predicate vectors. The one or more predicate vector proofs may, in some embodiments, comprise one or more predicate vector commitments generated using the one or more predicate vectors and a commitment function. These predicate vector commitments may comprise additively homomorphic or fully homomorphic commitments. In some embodiments, prior to obtaining the one or more predicate vector proofs, the database computer can generate the one or more predicate vector proofs using the one or more predicate vectors, e.g., by inputting the one or more predicate vectors into the commitment function. In many cases, the database computer can generate the one or more predicate vector proofs after receiving an aggregation query from the client computer (e.g., at step 904) because the predicate function (and therefore the one or more predicate vectors) may be dependent on conditions or clauses defined by the aggregation query. However, in some cases the database computer may receive aggregation queries comprising common conditions or clauses, and as such, the database computer can reuse predicate vector proofs generated using prior aggregation queries. The one or more predicate vector proofs can be configured to enable the client computer to verify the query result. More specifically, the client computer can use the one or more data record proofs and the one or more predicate vector proofs to verify that the database computer correctly determined and evaluated the predicate function, as well as used the plurality of predicate commitments to verify that the database computer correctly generated the query result, as described in more detail below with reference to FIG. 10.

At step 914, the database computer can determine a vector operation form of the aggregation query. The vector operation form of the aggregation query can define a sequence of one or more vector operations to be performed on one or more predicate vectors or one or more vectors derived from the one or more predicate vectors. These one or more vector operations could comprise, for example, inner product operations (including elementwise multiplication and the dot product), vector addition operations, vector subtraction operations, etc. A sequence of one or more vector operations could comprise, for example, performing an inner product operation on two predicate vectors (e.g., an elementwise multiplication) then subtracting a third predicate vector from the vector derived from the inner product operation. The vector operation form of the aggregation query may comprise a three conjugate normal form (3-CNF), as described above, or any other appropriate form. The vector operation form of the aggregation query may enable the database computer to evaluate the query and produce a query result. Additionally, the vector operation form of the aggregation query may enable the database computer prove the correctness of the query result using efficient proving techniques, such as those disclosed in [1].

At step 916, the database computer can generate one or more vector operation proofs based on the one or more vector operations. The one or more vector operation proofs may prove that the one or more vector operations were evaluated correctly. For example, for a vector operation form of an aggregation query A+B−AB (where A and B are predicate vectors), a vector operation proof may be generated to prove that the database computer correctly computed the inner product AB. The one or more vector operation proofs may be generated according to any appropriate techniques, such as the techniques described in [1]. In some embodiments, the vector operation proofs may comprise homomorphic commitments. These vector operation proofs may enable the client computer to verify that the database computer correctly evaluated the vector operation form of the aggregation query, and thereby correctly evaluated the aggregation query and produced a correct query result.

At step 918, the database computer can generate noise value using one or more privacy parameters. This may comprise a differentially-private noise value $z(\epsilon, \delta)$ generated using privacy parameters $\epsilon$, $\delta$ as described above. By adding a differentially-private noise value to a query result, the aggregation query system can achieve differential privacy, thereby protecting potentially sensitive or private digital data records stored in the database. The privacy parameters $\epsilon$, $\delta$ can control aspects of the noise value. For example the parameter $\epsilon$ can control the maximum difference between a differentially-private query result and a corresponding non-differentially-private query result, and the parameter $\delta$ can control the probability of sensitive information being leaked.

Likewise at step 918 the database computer can generate a noise value commitment (based on the noise value) using the commitment function. The commitment function may comprise a same commitment function used to generate the one or more data vector proofs (if applicable). The noise value commitment may comprise an additively homomorphic or fully homomorphic commitment. Later, a client computer can use the noise value commitment to verify that the database computer correctly generated the query result, e.g., by adding the noise value to the query result.

At step 920, the database computer can generate a query result by evaluating the vector operation form of the aggregation query using the one or more predicate vectors and adding the noise value. For example, for a vector operation form of an aggregation query comprising the expression A+B−AB, where A and B are the one or more predicate vectors, the database computer can compute the result of A+B−AB, calculate the inner product (e.g., the dot product) of the result with an all-ones vector, then add the noise value to produce the query result.

At step 922, the database computer can transmit the query result, the one or more predicate vector proofs, the one or more vector operation proofs, and the noise value commitment to the client computer. The one or more predicate vector proofs, the one or more vector operation proofs and the noise value commitment may be configured to enable verification of the query result. The database computer can transmit the query result and this other data to the client computer via any appropriate means, such as via a network such as the Internet.

The client computer may be configured to use the one or more data vector proofs, the one or more predicate vector proofs, the one or more predicate functions, the one or more vector operation proofs, and the noise value commitment to verify the query result. At step 924, the client computer can perform this verification process. The client computer can use the one or more data vector proofs, the one or more predicate vector proofs, and the one or more predicate functions to verify the one or more predicate vector proofs and in doing so, the client computer can verify that the database computer correctly identified data record vectors corresponding to the aggregation query and correctly applied the one or more predicate function to those data record vectors. Additionally, the client computer can use the one or more predicate vector proofs to verify the one or more vector operation proofs, thereby verifying that the database computer correctly evaluated the vector operation form of the aggregation query. Further, the client computer can use the one or more vector operation proofs and the noise value commitment to verify the query result, thereby verifying that the database computer correctly added differentially-private noise to the query result, thereby preserving the privacy of the data records. This verification process is described in more detail below with reference to FIG. 10.

E. Verification

Figure 10:
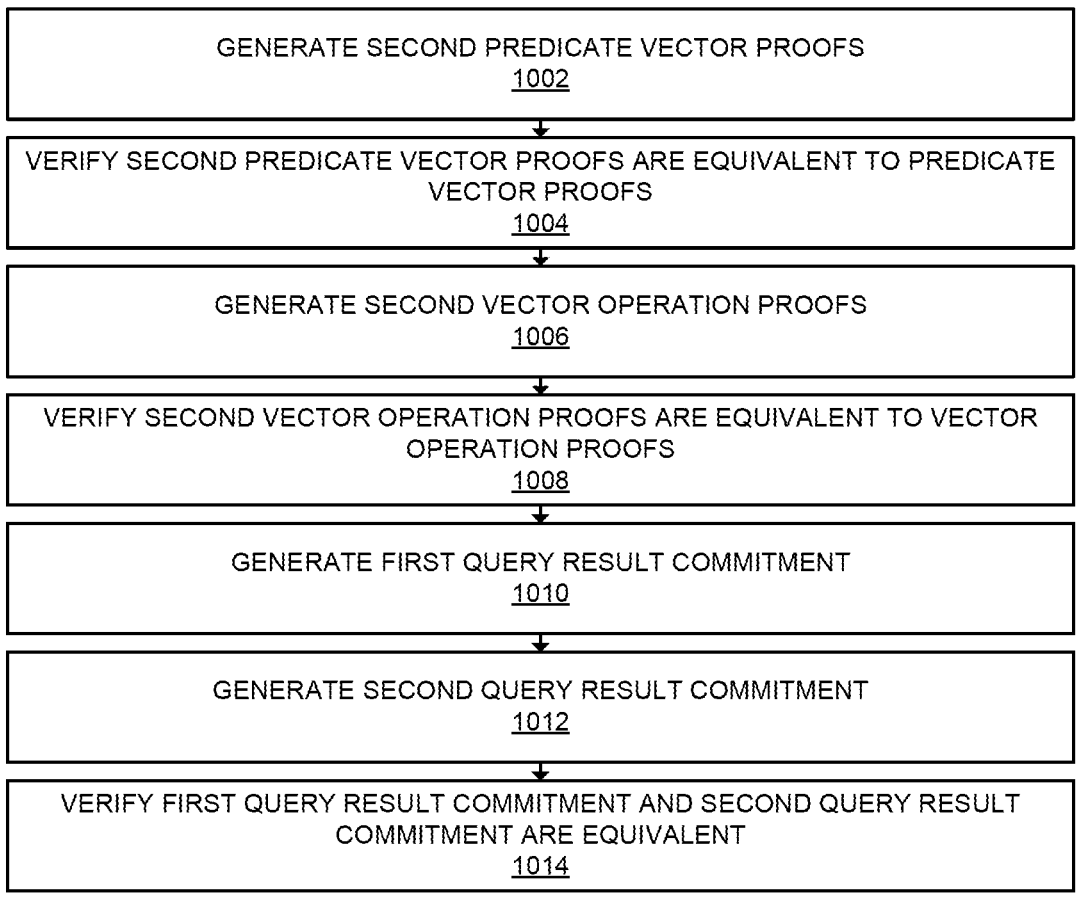
FIG. 10 illustrates a flowchart corresponding to a vector-based method for verifying the correctness of aggregation queries and digital data records according to some embodiments.

FIG. 10 illustrates a flowchart corresponding to a vector-based method for verifying the correctness of aggregation queries and digital data records according to some embodiments.

At step 1002 the client computer can generate one or more second predicate vector proofs by applying the one or more predicate functions to the one or more data vector proofs, e.g., by inputting the one or more data vector proofs (e.g., generated and published at step 902 of FIG. 9) into the predicate function. The vector proof system may have homomorphic properties, such that applying the one or more predicate functions to the one or more data vector proofs may be equivalent to the one or more predicate vector proofs. In some embodiments, the one or more data vector proofs can comprise one or more data vector commitments, generated by inputting one or more data vectors into a commitment function. Likewise, the one or more second predicate vector proofs and the one or more predicate vector proofs can comprise predicate vector commitments.

At step 1004, the client computer can verify that the one or more second predicate vector proofs and the one or more predicate vector proofs (received, e.g., at step 922) are equivalent. In doing so, the client computer can verify that the database computer correctly evaluated the one or more predicate function on the one or more data vectors, and therefore correctly identified data records that were relevant to the aggregation query.

Having verified that the database computer correctly evaluated the one or more predicate functions on the one or more data records, the client computer can now verify that the database computer correctly evaluated the vector operation form of the aggregation query, and therefore correctly aggregated the predicate vectors.

At step 1006, the client computer can generate one or more second vector operation proofs based on the one or more predicate vector proofs and the vector operation form of the aggregation query, e.g., by applying the operations defined by the vector operation form of the aggregation query to the one or more second vector operation proofs, which can comprise, e.g., homomorphic commitments.

At step 1008, the client computer can verify that the one or more second vector operation proofs are equivalent to the one or more vector operation proofs, thereby verifying that the database computer correctly evaluated the vector operation form of the aggregation query. Alternatively, the client computer can verify the one or more vector operation proofs in a different manner, depending on the particular proving system being used. As an example, methods used to verify a Bulletproof [1] may be different than the techniques described above with reference to steps 1004 and 1006.

Having verified that the database computer correctly evaluated the vector operation form of the aggregation query, and therefore correctly aggregated the predicate vectors, the client computer can now verify the query result, e.g., that the query result is correct and that the database computer added differentially-private noise to the query result. At step 1010, the client computer can generate a first query result commitment using the query result and a commitment function, e.g., by inputting the query result into the commitment function. At step 1012, the client computer can generate a second query result commitment by combining the one or more vector operation proofs and the noise value commitment, thereby generating a second query result commitment. The second query result commitment can comprise a sum of the one or more vector operation proofs (which may comprise commitments) and the noise value commitment.

At step 1014, the client computer can verify that the first query result commitment and the second query result commitment are equivalent. Due to the homomorphic nature of the commitment function and the proof system, the first query result commitment and the second query result commitment can be equivalent if the database computer correctly evaluated the aggregation query. In this way, the client computer can verify that the database computer correctly evaluated the aggregation query (producing an accurate query result) and correctly included differentially-private noise in the query result, thereby preserving privacy.

VI. Computer System

Figure 11:
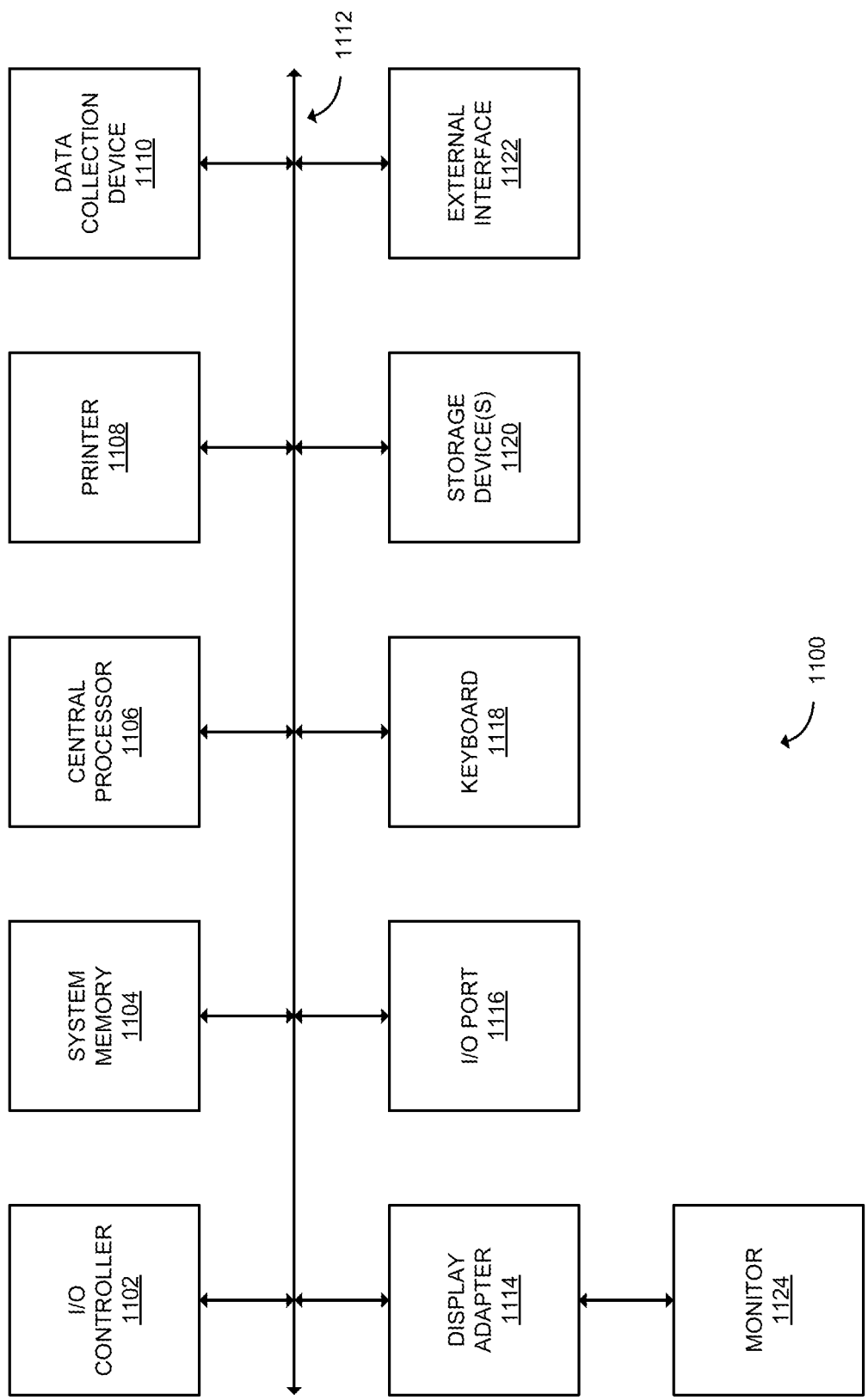
FIG. 11 shows an exemplary computer system according to some embodiments.

Any of the computer systems mentioned herein may utilize any suitable number of subsystems. Examples of such subsystems are shown in FIG. 11 in computer system 1100. In some embodiments, a computer system includes a single computer apparatus, where the subsystems can be the components of the computer apparatus. In other embodiments, a computer system can include multiple computer apparatuses, each being a subsystem, with internal components. A computer system can include, as examples, desktop and laptop computers, tablets, mobile phones and other mobile devices.

The subsystems shown in FIG. 11 are interconnected via a system bus 1112. Additional subsystems such as a printer 1108, keyboard 1118, storage device(s) 1120, monitor 1124 (e.g., a display screen, such as an LED), which is coupled to display adapter 1114, and others are shown. Peripherals and input/output (I/O) devices, which couple to I/O controller 1102, can be connected to the computer system by any number of means known in the art such as input/output (I/O) port 1116 (e.g., USB, FireWire©). For example, I/O port 1116 or external interface 1122 (e.g. Ethernet, Wi-Fi, etc.) can be used to connect computer system 1100 to a wide area network such as the Internet, a mouse input device, or a scanner. The interconnection via system bus 1112 allows the central processor 1106 to communicate with each subsystem and to control the execution of a plurality of instructions from system memory 1104 or the storage device(s) 1120 (e.g., a fixed disk, such as a hard drive, or optical disk), as well as the exchange of information between subsystems. The system memory 1104 and/or the storage device(s) 1120 may embody a computer readable medium. This computer readable medium may store code or instructions, executable by the processor, for performing any of the methods described herein. Another subsystem is a data collection device 1110, such as a camera, microphone, accelerometer, and the like. Any of the data mentioned herein can be output from one component to another component and can be output to the user.

A computer system can include a plurality of the same components or subsystems, e.g., connected together by external interface 1122, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

VII. REFERENCES

1. Bunz, Benedikt, et al. "Bulletproofs: Short proofs for confidential transactions and more." 2018 IEEE Symposium on Security and Privacy (SP). IEEE, 2018.
2. Ben-Sasson, Eli, Prahladh Harsha, and Sofya Raskhodnikova. "Some 3CNF properties are hard to test." SIAM Journal on Computing 35.1 (2005): 1-21. APA

What is claimed is:

1. A method of servicing differentially-private aggregation queries, the method comprising performing, by a database computer:
   receiving, from a client computer, an aggregation query, the aggregation query identifying one or more attributes;
   identifying, based on the one or more attributes, a plurality of digital data records stored in a database communicably coupled to the database computer;
   generating and publishing a plurality of data record commitments corresponding to the plurality of digital data records, the plurality of data record commitments accessible to the client computer, wherein the plurality of data record commitments are configured to enable the client computer to verify the plurality of digital data records;
   generating a plurality of predicates using the plurality of digital data records and a predicate function;
   obtaining, based on the plurality of predicates, a plurality of predicate commitments generated using a commitment function;
   generating a noise value using one or more privacy parameters;
   generating, based on the noise value, a noise value commitment using the commitment function, wherein the commitment function includes a hash function;
   aggregating the plurality of predicates and the noise value to generate a query result; and
   transmitting the query result, the plurality of predicate commitments, and the noise value commitment to the client computer, wherein the plurality of data record commitments, the plurality of predicate commitments, and the noise value commitment are configured to enable verification of the query result by the client computer.

2. The method of claim 1, wherein the plurality of predicate commitments, the noise value commitment, and the plurality of data record commitments comprise additive homomorphic or fully homomorphic commitments.

3. The method of claim 1, wherein aggregating the plurality of predicates and the noise value to generate the query result comprises generating a sum of the plurality of predicates and the noise value, wherein the query result comprises the sum.

4. The method of claim 1, further comprising, prior to generating the plurality of predicates using the plurality of digital data records and the predicate function:
   determining the predicate function using the aggregation query.

5. The method of claim 4, wherein the aggregation query defines one or more conditions or one or more clauses, and wherein the one or more conditions or clauses are used to determine the predicate function using the aggregation query.

6. The method of claim 5, wherein the database computer determines the predicate function such that the predicate function outputs a predicate comprising a Boolean value of one or true if an input data record satisfies the one or more conditions or the one or more clauses, and the predicate function outputs a predicate comprising a Boolean value of zero or false if the input data record does not satisfy the one or more conditions or the one or more clauses, and wherein the plurality of predicates comprises a plurality of Boolean values.

7. The method of claim 1, further comprising, prior to obtaining the plurality of predicate commitments generated using the commitment function:
    generating the plurality of predicate commitments using the plurality of predicates and the commitment function.

8. The method of claim 1, wherein (1) the client computer is configured to use the plurality of data record commitments, the plurality of predicate commitments, and the predicate function to verify that the database computer correctly identified the plurality of digital data records and correctly generated the plurality of predicate commitments, and (2) the client computer is configured to use the query result, the plurality of predicate commitments, and the noise value commitment to verify that the database computer correctly generated the query result.

9. The method of claim 8, wherein (1) the client computer is configured to use the plurality of data record commitments, the plurality of predicate commitments, and the predicate function to verify that the database computer correctly identified the plurality of digital data records and correctly generated the plurality of predicate commitments by:
    generating a second plurality of predicate commitments using the plurality of data record commitments and the predicate function; and
    verifying that the second plurality of predicate commitments and the plurality of predicate commitments are equivalent.

10. The method of claim 8, wherein (1) the client computer is configured to use the plurality of data record commitments corresponding to the plurality of digital data records, the plurality of predicate commitments, and the predicate function to verify that the database computer correctly identified the plurality of digital data records and correctly generated the plurality of predicate commitments by:
    randomly selecting a sample of data record commitments from the plurality of data record commitments, wherein the sample of data record commitments comprises less data record commitments than the plurality of data record commitments;
    selecting a sample of predicate commitments from the plurality of predicate commitments, wherein the sample of predicate commitments corresponds to the sample of data record commitments, and wherein the sample of predicate commitments comprises less predicate commitments than the plurality of predicate commitments;
    generating a second sample of predicate commitments using the sample of data record commitments and the predicate function, wherein the second sample of predicate commitments comprises less predicate commitments than the plurality of predicate commitments; and
    verifying that the second sample of predicate commitments and the sample of predicate commitments are equivalent.

11. The method of claim 8, wherein (2) the client computer is configured to use the query result, the plurality of predicate commitments and the noise value commitment to verify that the database computer correctly generated the query result by:
    generating a first query result commitment using the query result and the commitment function;
    generating a second query result commitment by generating a sum of the plurality of predicate commitments and the noise value commitment, wherein the second query result commitment comprises the sum; and
    verifying that the first query result commitment and the second query result commitment are equivalent.

12. A method of servicing differentially-private aggregation queries, the method comprising performing, by a database computer:
    receiving, from a client computer, an aggregation query, the aggregation query identifying one or more attributes and comprising one or more query clauses;
    identifying, based on the one or more attributes, one or more data record vectors corresponding to a plurality of digital data records stored in a database communicably coupled to the database computer;
    generating and publishing one or more data vector proofs corresponding to the one or more data record vectors, the one or more data vector proofs accessible to the client computer, wherein the one or more data vector proofs are configured to enable the client computer to verify the plurality of digital data records;
    generating one or more predicate vectors based on the one or more data record vectors and one or more predicate functions;
    obtaining, based on the one or more predicate vectors, one or more predicate vector proofs;
    determining a vector operation form of the aggregation query, the vector operation form of the aggregation query defining a sequence of one or more vector operations to be performed on the one or more predicate vectors or one or more vectors derived from the one or more predicate vectors;
    generating, based on the sequence of one or more vector operations, one or more vector operation proofs;
    generating a noise value using one or more privacy parameters;
    generating, based on the noise value, a noise value commitment using a commitment function, wherein the commitment function includes a hash function;
    generating a query result by evaluating the vector operation form of the aggregation query using the one or more predicate vectors and adding the noise value; and
    transmitting the query result, the one or more predicate vector proofs, the one or more vector operation proofs, and the noise value commitment to the client computer, wherein the one or more data vector proofs, the one or more predicate vector proofs, the one or more vector operation proofs, and the noise value commitment are configured to enable verification of the query result by the client computer.

13. The method of claim 12, wherein the one or more data record vectors are encoded using one hot encoding.

14. The method of claim 12, wherein the one or more vector operation proofs comprise one or more zero-knowledge proofs implemented using a Bulletproof proving system, and wherein the vector operation form of the aggregation query comprises a three conjugate normal form of the aggregation query.

15. The method of claim 12, wherein the one or more data vector proofs comprise one or more data vector commitments, and wherein generating the one or more data vector proofs comprises inputting the one or more data record vectors into a commitment function, an output of the commitment function comprising the one or more data vector proofs.

16. The method of claim 12, wherein (1) the client computer is configured to use the one or more data vector proofs, the one or more predicate vector proofs, and the one or more predicate functions to verify the one or more predicate vector proofs, (2) the client computer is configured to use the one or more predicate vector proofs to verify the one or more vector operation proofs, and (3) the client computer is configured to use the one or more vector operation proofs and the noise value commitment to verify the query result.

17. The method of claim 16, wherein (1) the client computer is configured to use the one or more data vector proofs, the one or more predicate vector proofs, and the one or more predicate functions to verify the one or more predicate vector proofs by:
  generating one or more second predicate vector proofs by applying the one or more predicate functions to the one or more or more data vector proofs; and
  verifying that the one or more second predicate vector proofs and the one or more predicate vector proofs are equivalent.

18. The method of claim 16, wherein (2) the client computer is configured to use the one or more predicate vector proofs to verify the one or more vector operation proofs by:
  generating one or more second vector operation proofs based on the one or more predicate vector proofs and the vector operation form of the aggregation query; and
  verifying that the one or more second vector operation proofs are equivalent to the one or more vector operation proofs.

19. The method of claim 16, wherein (3) the client computer is configured to use the one or more vector operation proofs and the noise value commitment to verify the query result by:
  generating a first query result commitment using the query result and a commitment function;
  combining the one or more vector operation proofs and the noise value commitment, thereby generating a second query result commitment; and
  verifying that the first query result commitment and the second query result commitment are equivalent.

20. A database computer comprising:
a processor; and
a non-transitory computer readable medium coupled to the processor, the non-transitory computer readable medium comprising code, executable by the processor to perform a method of servicing differentially-private aggregation queries, the method comprising:
receiving, from a client computer, an aggregation query, the aggregation query identifying one or more attributes;
identifying, based on the one or more attributes, a plurality of digital data records stored in a database communicably coupled to the database computer;
generating and publishing a plurality of data record commitments corresponding to the plurality of digital data records, the plurality of data record commitments accessible to the client computer, wherein the plurality of data record commitments are configured to enable the client computer to verify the plurality of digital data records;
generating a plurality of predicates using the plurality of digital data records and a predicate function;
obtaining, based on the plurality of predicates, a plurality of predicate commitments generated using a commitment function;
generating a noise value using one or more privacy parameters;
generating, based on the noise value, a noise value commitment using the commitment function, wherein the commitment function includes a hash function;
aggregating the plurality of predicates and the noise value to generate a query result; and
transmitting the query result, the plurality of predicate commitments, and the noise value commitment to the client computer, wherein the plurality of data record commitments, the plurality of predicate commitments, and the noise value commitment are configured to enable verification of the query result by the client computer.

* * * * *